(12) United States Patent
Makkar et al.

(10) Patent No.: US 12,274,950 B2
(45) Date of Patent: Apr. 15, 2025

(54) METHODS AND SYSTEM FOR SMART VOICE CHAT IN MULTIPLAYER GAMING

(71) Applicant: Adeia Guides Inc., San Jose, CA (US)

(72) Inventors: Anjum Makkar, Punjab (IN); Ishan Dhanwal, Haryana (IN); Vivek Sehgal, Uttar Pradesh (IN); Simranjeet Gill, Punjab (IN); Cato Yang, San Jose, CA (US)

(73) Assignee: Adeia Guides Inc., San Jose, CA (US)

( * ) Notice: Subject to any disclaimer, the term of this patent is extended or adjusted under 35 U.S.C. 154(b) by 396 days.

(21) Appl. No.: 17/591,792

(22) Filed: Feb. 3, 2022

(65) Prior Publication Data

US 2023/0241518 A1    Aug. 3, 2023

(51) Int. Cl.
| | |
|---|---|
| A63F 13/87 | (2014.01) |
| A63F 13/46 | (2014.01) |
| A63F 13/56 | (2014.01) |
| A63F 13/58 | (2014.01) |

(52) U.S. Cl.
CPC .............. *A63F 13/87* (2014.09); *A63F 13/46* (2014.09); *A63F 13/56* (2014.09); *A63F 13/58* (2014.09)

(58) Field of Classification Search
CPC .......... A63F 13/87; A63F 13/46; A63F 13/56; A63F 13/58
See application file for complete search history.

(56) References Cited

U.S. PATENT DOCUMENTS

| | | |
|---|---|---|
| 7,761,892 B2 | 7/2010 | Ellis et al. |
| 8,046,801 B2 | 10/2011 | Ellis et al. |
| 9,294,819 B2 | 3/2016 | Lee et al. |
| 9,387,401 B2 | 7/2016 | Knutsson et al. |
| 10,843,089 B2 | 11/2020 | Sullivan |
| 2005/0251827 A1 | 11/2005 | Ellis et al. |
| 2008/0215679 A1 | 9/2008 | Gillo et al. |
| 2008/0215971 A1 | 9/2008 | Gillo et al. |
| 2012/0322527 A1 | 12/2012 | Aoki et al. |
| 2017/0168498 A1* | 6/2017 | Nakajima ........... G01C 21/3837 |
| 2021/0031106 A1* | 2/2021 | Alderman ............ A63F 13/573 |

\* cited by examiner

*Primary Examiner* — Thomas H Henry
(74) *Attorney, Agent, or Firm* — Haley Guiliano LLP

(57) ABSTRACT

Systems and methods for providing smart communications in a video game environment are disclosed. A first positional vector of a first user within a video game environment and a second positional vector of a second user within the video game environment are determined. In a first communication between the first user and second user, the first positional information is detected and a first translation vector between the first positional vector of the first user and the second positional vector of the second user is calculated. Based on the first translation vector, the first positional information is corrected, and the corrected positional information is transmitted to the second user.

30 Claims, 14 Drawing Sheets

| Official Term (Weighting) | Alternate Term 1 (Weighting) | Alternate Term 2 (Weighting) | Alternate Term 3 (Weighting) |
|---|---|---|---|
| Attack Damage Carry (1) | ADC (5) | Bot Carry (3) | Carry (0.5) |
| Baron Nashor (1) | Baron (8) | Nashor (3) | Nash (0.5) |
| Crest of Insight (0.1) | Blue Buff (6) | Blue (2) | Crest (1) |
| Middle Lane (1) | Mid (4) | Mid Lane (4) | |
| Ambush (0.1) | Gank (9) | Ganking (6) | |

METHODS AND SYSTEM FOR SMART VOICE CHAT IN MULTIPLAYER GAMING

BACKGROUND

The present disclosure relates to systems for smart communications in multiplayer gaming and, more particularly, to systems and related processes for providing relative information between players of a multiplayer game.

SUMMARY

While traditionally catering to an individual user's experience, video games, whether experienced through a traditional display device such as a television, computer, etc., or through wearable electronics, mobile devices or augmented reality/virtual reality devices, have increasingly become a group playing experience. For example, video games now let users interact with one another through the video game environment in multiplayer games through voice chat, text chat, in-game interactions, or the like. In typical scenarios, multiple users, at disparate locations, log in (e.g., via the Internet) to a common platform that hosts the multiplayer game. Multiplayer games include, for example, Massive Multiplayer Online ("MMOs") video games, First Person Shooters ("FPS"), Battle Royale, or Multiplayer Online Battle Arena ("MOBA") games.

The video game environment may be rendered as a two-dimensional space or a three-dimensional space, and users are typically represented in the video game environment by an avatar. The user's (or player's) avatar may move freely around the video game environment, and the avatar may be displayed to other users sharing the video game environment. While in this video game environment, users can move around the video game environment. A three-dimensional video game environment is typically defined by a series of planes that define the boundaries of the video game environment, in which users may move around. Additionally, objects may be modeled and placed within the boundaries of the video game environment. These objects may form additional boundaries to the movement of the avatar and/or may be interacted with by an avatar. For example, an avatar may not be able to move through an object designed to appear as a table in a video game environment but may be able to move under or stand on top of the table. Additionally, these objects may block a line of sight of the user. For example, in addition to being unable to move through the object in the video game environment, a user may not be able to see through the object. This technique is typically used in video game environments to prevent one user from being able to view the position of the avatars of other users, who are commonly on opposing teams, which in many cases adds to the enjoyment of the user and introduces strategy and skill into the video game. For example, the video game environment mimics the real world, in which a person cannot see another person hiding behind a wall in an FPS-style "team deathmatch."

It is also typical for multiplayer games to allow users to communicate with each other using in-game voice or text chat. However, users often provide inadequate communication and get confused with the directional instructions provided by a teammate in voice/text chat. For instance, Player 1 may notice an enemy avatar from a player of an opposing team (which may be referred to as "an enemy") in front of them and convey the same to their teammate, Player 2. However, Player 1 may not provide an accurate description to Player 2, e.g., "There is an enemy in front of me," which is information that is relative to Player 1's position, thus Player 2 is not able to figure out the correct direction relative to their position if they are not facing the same way, or do not know what direction Player 1 is facing. This can create confusion among the team and may lead to, for example, the team's defeat in the video game, in particular if the opposing team is more organized and has better communication.

In another example, if an object of interest referenced by Player 1 (e.g., a first object) is in the field of view of Player 1, but not in the field of view of Player 2, either due to a line-of-sight problem (e.g., a second object obscuring the view of the first object) or the first object not being within the field of view of Player 2 at all, Player 2 is left not understanding where, or in what direction, the first object of interest is. Player 1 may say, "On my left," which would confuse Player 2 in that moment, as they'd have to, again, be aware of Player 1's directional orientation at that time.

In view of the foregoing, the present disclosure provides systems and related methods that provide smart communications in multiplayer gaming and, more particularly, provide relative information between users of a multiplayer game by analyzing the communication between users/players. The analysis of the communication to identify positional information includes extracting relevant information, such as relative directions (e.g., to my left/right, in front/behind, above/below, etc.), distance from the speaker, and positional information with respect to landmarks (e.g., behind the tree, on the roof, in an upstairs window, etc.) and an object of interest (e.g., an enemy avatar, a flag to capture, etc.).

In a first approach, there is provided a method for providing smart communications in a video game environment. A first positional vector of a first user within a video game environment is determined, as well as a second positional vector for a second user within the video game environment. For example, relative to an origin point in the video game environment, the location and distance of the user (or the user's avatar) within the boundaries of the game environment are determined. Positional information is detected in a first communication between the first user and the second user (e.g., the first user communicating the location of an object of interest in a chat box or with voice communication to the second user). A translation vector (and/or a rotational vector) between the first positional vector of the first user and the second positional vector of the second user is then calculated and, based on the translation vector, the positional information is corrected (e.g., providing information relative to the second user's position and direction, instead of the first user's position and direction). For example, the positional information in the first communication may include a direction, distance, elevation, or other information describing a particular location within the game environment relative to the first user's current position and/or field of view. Using the translation vector, the positional information may be corrected so that the direction, distance, elevation, or other information instead describes the particular location within the game environment relative to the position and/or field of view of the second user. The correct positional information is displayed to the second user. For example, the corrected position information is then transmitted to the second user, or the local hardware of the user is made to generate for display the corrected positional information to the second user. Likewise, the translation vector can be used to inform the second user the direction and distance to an object of interest that the first user is referring to in the communication, relative to the second user, even if that location is behind a wall or object, effectively overcoming the aforementioned problems.

In some examples, correcting the first positional information is carried out in response to the first positional information not corresponding to the translation vector. For example, Player 1 may interact with another player in an audio communication (e.g., directed at one or more other users) informing them of an action corresponding to an in-game sound (e.g., walking, opening a door, firing a gun, etc.) with positional information relative to Player 1. The present system uses the translation vector to determine that the first positional information would not apply to Player 2 because the information is not relative to their position or point of view.

The method may further comprise calculating a difference score between the first positional information and video game environment data. Video game environment data may comprise the positional information of the avatars of the first and second user, video game terminology for locations, weapons, avatars, objects of interest, and the like. The difference score assess one or more of the accuracy, conciseness, completeness, and proper use of terminology of the information within the first communication compared to data from the video game environment itself. The difference score can be used to assign a callout score to the first positional information provided by the first user. For example, the difference score may be an arbitrary metric wherein all aspects of the first positional information (e.g., accuracy, conciseness, completeness, and proper use of terminology) are assessed and scored, whereas the callout score may be a user-friendly or meaningful score (e.g., out of 10, out of 100%, or a grade such as "S", "A", "B" common to modern video games), that a user can readily understand. The callout score is determined based on the calculated difference score, and feedback can be provided to the first user based on callout score. For example, the user may score poorly in a number of areas in the difference score, but the callout score can focus on one aspect, such as proper use of terminology. For example, if the callout score is below a threshold (e.g., 75%, 8 out of 10, etc.) a suggestion can be made to the user on how to improve the callout score, by using a popular phrase from the wider community of players of the video game.

In addition, the method further comprises retrieving a first field of view of the first user and retrieving a second field of view of the second user. The field of view of a user may be retrieved from data within the video game environment or determined based on the avatar's positional vector (e.g., location and direction). Typically, the field of view of an avatar in a video game environment is different from the field of view of the user, that is to say, the field of view of the user may be first person (i.e., from the perspective of the avatar) or third person (i.e., a view comprising the user's avatar and the surrounding area). The field of view of the avatar can be further affected by the user's actions, for example, in an FPS, if the user is aiming down the sights of a weapon, the field of view is reduced and magnified. An object of interest in the field of view of the first user is identified, wherein the object of interest is not in the field of view of the second user. For example, video game environments featuring first-person or third-person perspectives require three-dimensional rendering of the video game environments, in which avatars associated with a user may move and enter in or out of a user's field of view. Describing features in three-dimensional environments that a user can see in their field of view, such as in audio communications, is common, but not necessarily helpful to other users with a different field of view. Obtaining and using the field of view of a user or their avatar can assist in the identification of an object of interest and therefore in the indication to the second user of the location of the objection of interest from their perspective. The correcting of the first positional information is therefore also based on the object of interest. The object of interest maybe any one of, for example, a user, an avatar of a user, an enemy, an immovable object, a moveable object, a target zone, or an item.

In some examples, the method further comprises determining a third positional vector for the object of interest and calculating a first rotational vector for the field of view of the second user based on the second positional vector and the third positional vector. The first rotational vector is the amount of rotational required to place the object of interest substantially within the field of view of the second user.

Moreover, correcting the first positional information may further comprise transcribing the rotational vector into a set of user-readable instructions and, transmitting the user-readable instructions to a computing device of the second user. In the first instance, the calculations and determinations made for the positional vectors may be written in vector notation, matrix notation, or the like, which may not be immediately understandable or readable by users of the video game without specialist knowledge. Accordingly, the information provided from the first user to the second user can be corrected with instructions that the second user can understand. In some examples, this may further comprise translating the language of the instructions, to allow users without a common language to still function together as a team.

In some examples, the method further comprises determining the object of interest is obscured by a second object within the video game environment, such as a wall or other object. A second translation vector based on the second positional vector of the second user and the rotational vector can be calculated and used to update the first rotational vector. In addition, the system may determine the location of an object of interest based on a plurality of factors used in order to reflect the conditions and positions of objects in the video game environment. For example, the video game application may key the location of the on-screen graphic to the line of sight of the first user. By doing so, an intuitive pointer to the second user can be provided (such as distance and a direction to face to observe the object of interest). Moreover, if the object of interest is not within the line of sight of the first user (e.g., the object of interest is behind a wall in the video game environment), the video game application may present the on-screen graphic within the line of sight of the user with a point through the object or directions to move and look. By doing so, the video game application indicates to the second user that the object of interest is behind the obstruction.

Detecting first positional information, as described above, may further comprise extracting directional information from the first communication from the first user, extracting landmark information from the first communication from the first user, and/or extracting supplementary information about the video game environment. The supplementary information may be at least one of a username, a user-health status, a weapon used by a user, movement characteristics of a user, type of object of interest, characteristics of an object of interest, movement characteristics of an object of interest, a user action, a user intention, and/or a timestamp of the communication.

In addition, the method may further comprise extracting language from media content external to the video game environment. For example, media content sources may comprise YouTube videos, Twitch videos on demand (VODs), Facebook Gaming, in-game communications from other users, or the like. In some examples, the media content is related to the video game environment, that is to say that the media content is, for example, VODs of the video game environment uploaded from media sources. The system may, after extracting information from the media content, create a library of model (i.e., ideal) language based on the language of the media content. A weighting is assigned to the more frequent language found in the media content; in this way the ideal language that should be used in an in-game callout is related to the most common language used by the wider community of players/users. In addition, language used in the first communication can also be identified (and/or extracted) and compared with the library of model language. Feedback can be provided to the first user based on the comparison. For example, if the first user's callout is, "there's a guy hiding in the trees," the feedback provided could be a suggestion that the first user provide their teammate directions relative to their position.

In some examples, the method further comprises generating an on-screen graphic associated with the corrected first positional information. In this way, the user can easily identify, from their perspective, the object that the first user has referred to, even with the poor communication from the first user. In addition, or alternatively, the on-screen graphic can be augmented to increase in size as a function of time passed since the first communication. Moreover, the rate of increase of size can be based on information extracted from the first communication. Finally, the on-screen graphic can be removed when the time passed reaches a threshold. For example, the video game application may, in the first instance, determine a size of the on-screen graphic based on a distance, within the video game environment, to a spotted enemy avatar or object of interest. In such cases, user interactions from users closer to the first user may appear bigger of sound louder (e.g., imitating the real-world condition that sounds are heard as louder the closer the user is to the source of the sound) than similar user interactions from users farther away. However, over time, the confidence in the exact location of the enemy avatar will decrease, as the enemy avatar may move out of sight and continue moving. Accordingly, the radius of the on-screen graphic is increased over time to show that the object of interest is likely still within a zone, but exactly where within the zone is unknown. In addition, after the radius reaches maximum size (which is proportional to a maximum time) the on-screen graphic is removed. Information from the first communication can be extracted and used to determine the rate of increase of the on-screen graphic. For example, if the first communication comprises information that that the enemy avatar is running, the rate of increase of the on-screen graphic will be greater than if the first communication comprises information that the avatar is crouched behind a wall. The extracted information may comprise at least one of movement characteristics of a user, type of object of interest, characteristics of an object of interest, movement characteristics of an object of interest, a user action, a user intention, or a timestamp of the communication. The threshold for determining when to remove the on-screen graphic is determined based on the information extracted from the first communication, such that, for example, a user who is running would cause a smaller threshold of time, due to the uncertainty in the position. In some examples, the threshold is inversely proportional to the rate of increase of the on-screen graphic.

In some examples, the first positional vector is associated with an area within the video game environment occupied by an avatar of the first user, and the second positional vector is associated with an area within the video game environment occupied by an avatar of the second user.

In another approach, there is provided a system for providing smart communications in a video game environment, the system comprising: means for determining a first positional vector of a first user within a video game environment; means for determining a second positional vector of a second user within the video game environment; means for detecting, in a first communication between the first user and second user, first positional information; means for calculating a first translation vector between the first positional vector of the first user and the second positional vector of the second user; means for correcting the first positional information based on the first translation vector; and means for causing to be generated for display the corrected positional information to the second user.

In another approach, there is provided a non-transitory computer-readable medium having instructions recorded thereon for providing smart communications in a video game environment, the instructions comprising determining a first positional vector of a first user within a video game environment; determining a second positional vector of a second user within the video game environment; detecting, in a first communication between the first user and second user, first positional information; calculating a first translation vector between the first positional vector of the first user and the second positional vector of the second user; correcting the first positional information based on the first translation vector; and transmitting the corrected positional information to the second user.

In another approach, there is provided a media device comprising a control module, a transceiver module and a network module configured to determine a first positional vector of a first user within a video game environment; determine a second positional vector of a second user within the video game environment; detect, in a first communication between the first user and second user, first positional information; calculate a first translation vector between the first positional vector of the first user and the second positional vector of the second user; correct the first positional information based on the first translation vector, and causing to be generated for display the corrected positional information to the second user.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
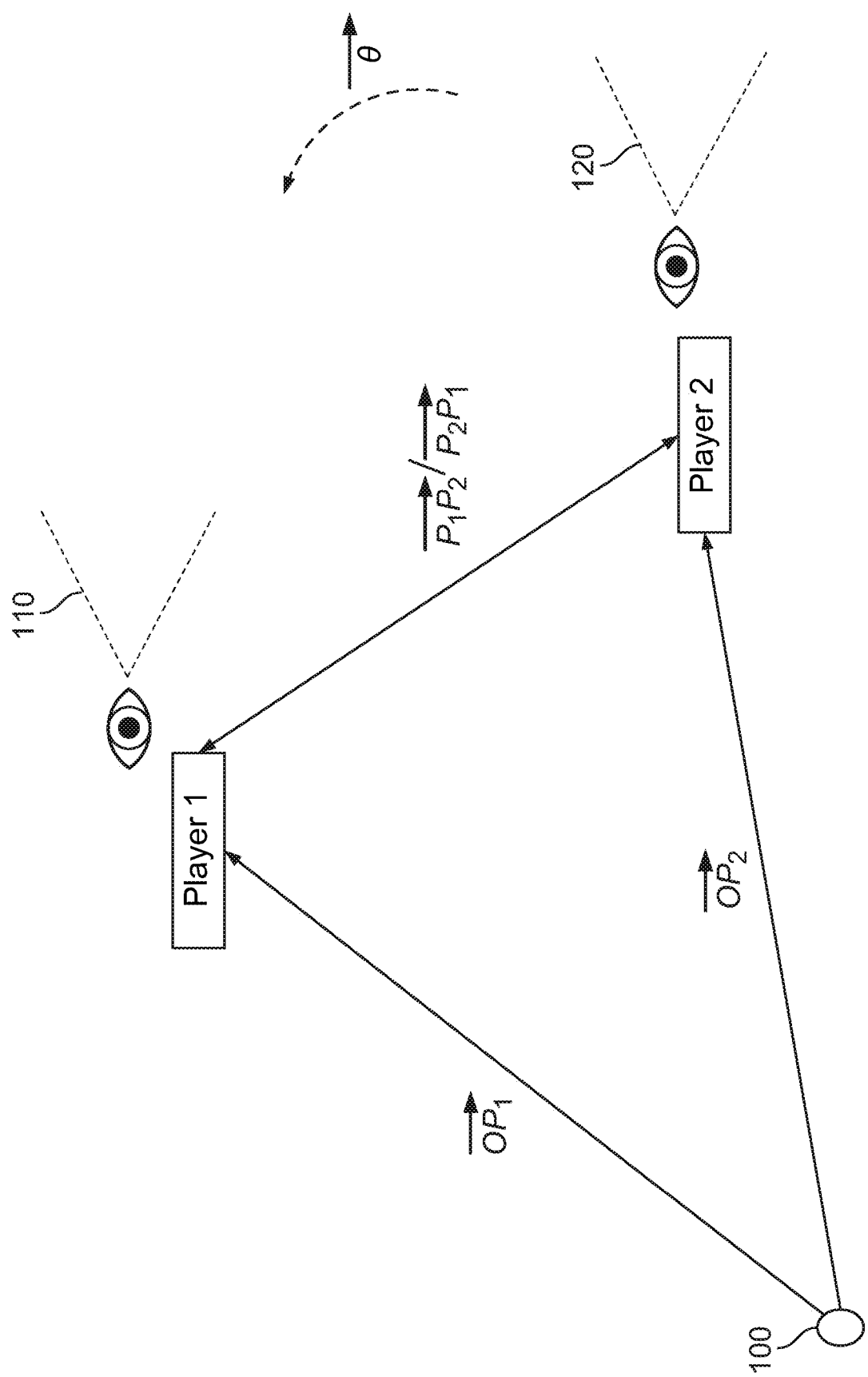
FIG. 1 is an illustrative diagram showing positional vectors and fields of view of players of a video game in a video game environment, in accordance with some embodiments of the disclosure.

As briefly described above, the directional conflict between users can be resolved by implementing a system that determines information from a first user (e.g., Player 1) that was provided to a second user (e.g., Player 2) and correct that information if it is determined that the information provided was inadequate. In this example, since Player 1 and Player 2 have different fields of view, and the direction of one may not be the same as another, the implemented system can convey the location by converting it to a listener's perspective. This solution is therefore scalable from a player-to-player interaction, which may be more appropriate for an FPS video game, to a player-to-team interaction, which may be more appropriate for a MOBA video game. Indeed, the present disclosure is equally applicable to both scenarios and many more which may not be explicitly referred to herein. Therefore, in the examples given within this disclosure, it is intended that the type of video games referred to within the description and figures are non-limiting and that any type of video game can benefit from the present disclosure.

Continuing the example above, if Player 1 is to say, "An enemy is in front of me" to Player 2, the system will analyze the speech and convert it with respect to Player 2's position and perspective (direction, distance, elevation, and the like). This ensures that the positional information is correct with respect to the listener, Player 2. Accordingly, Player 2 will see a message popping up on his screen that "Enemy is on your right," or, in some examples, the speech may be amended with a natural language unit to relay the same. This resolution will resolve the conflicts among the team and hence give the players an exemplary playing experience.

More particularly, the disclosure generally relates to smart communications in multiplayer gaming and, even more particularly, to systems and related processes for providing relative positional information for a common object of interest between players of a multiplayer game. This is carried out by converting positional information from a perspective of a speaker (e.g., avatar or another in-game character) to a perspective of a listener (e.g., an avatar or other in-game character) with the use of positional vectors and, optionally, rotational vectors to determine the correct information to convert within the original positional information provided by the speaker. Illustratively, the speaker and the listeners are players and teammates in a multiplayer game, and the positional information is conveyed through an in-game "callout" (e.g., the speaker communicates a position of an enemy to a teammate(s)). The disclosed techniques analyze positional information in the speaker communication (e.g., an enemy is in front of me) and identify location information of the speaker and of the listener (e.g., positional vectors, coordinates, a player field of view (FOV), and the like). The techniques use the location information to convert the positional information (e.g., the position of the enemy) from being relative to the speaker to being relative to the listener, and provides the converted positional information to the listener, for example, in a chat screen, as will be described in more detail below, with reference to the figures.

FIG. 1 is an illustrative diagram showing positional vectors and fields of views of players of a video game in a video game environment, in accordance with some embodiments of the disclosure. Shown in FIG. 1 is an origin point 100, Player 1 and their field of view 110, Player 2 and their field of view 120, and a plurality of vectors.

In geometry, a positional or position vector, also known as location vector or radius vector, is a Euclidean vector that represents the position of a point P in space in relation to an arbitrary reference origin, O, 100. Usually denoted x, r, or s, it corresponds to the straight line segment from O to P. In other words, it is the displacement or translation that maps the origin to P:

$$r = \overrightarrow{OP}$$

The term "position vector" is used mostly in the fields of differential geometry, mechanics and occasionally vector calculus. Frequently this is used in two-dimensional or three-dimensional space but can be easily generalized to Euclidean spaces and affine spaces of any dimension. This is relevant for video game environments where some avatars are "stealthed" and cannot be seen, or the like. In three dimensions, any set of three-dimensional coordinates and their corresponding basis vectors can be used to define the location of a point in space—whichever is the simplest for the task at hand may be used.

Referring to FIG. 1, vector $$\overrightarrow{OP_1}$$

is a first positional vector that snows the position of Player 1, a first user, from the origin point 100 within the video game environment. The origin 100 is a common origin between all objects within the video game environment. Similarly, $$\overrightarrow{OP_2}$$

is a second positional vector that shows the position of Player 2, a second user, from the origin 100.

Commonly, one uses the familiar Cartesian coordinate system, or sometimes spherical polar coordinates, or cylindrical coordinates:

$$r(t) \equiv r(x, y, z) \equiv x(t)\hat{e}_x + y(t)\hat{e}_y + z(t)\hat{e}_z$$
$$\equiv r(r, \theta, \varphi) \equiv r(t)\hat{e}_r(\theta(t), \varphi(t))$$
$$\equiv r(r, \theta, z) \equiv r(t)\hat{e}_r(\theta(t)) + z(t)\hat{e}_z$$

where t is a parameter, owing to their rectangular or circular symmetry. These different coordinates and corresponding basis vectors represent the same position vector. The choice of coordinate system is largely determined by the complexity of the resolution chosen to solve the communication issue between the players in the video game environment, or the level of intervention the system determines may be needed. In the first instance, the Cartesian coordinate system will be used for straight-line movements, where specifying the motion of an axis is simple: input the location to which the user should travel (or the amount of distance they should travel from the starting point), and a linear path to the specified location is provided; however, no directional information is provided, so for certain video games (such as FPS games) this may not be a sufficient solution.

Although Cartesian coordinates are straightforward for many applications, for some types of motion of an object of interest or for players within a video game environment constantly in motion, it might be necessary or more efficient to work in one of the non-linear coordinate systems, such as the polar or cylindrical coordinates. For example, if an avatar in constant motion around a video game environment is being targeted by a plurality of players, this motion involves circular interpolation around a plurality of players' points of reference; therefore, polar coordinates might be more convenient to work in than Cartesian coordinates. Spherical polar coordinates define a position in two-dimensional or three-dimensional space using a combination of linear and angular units. With spherical polar coordinates, a point is specified by a straight-line distance from a reference point (typically the origin 100 or the center of the user's point of view 110, 120), and an angle or two from a reference direction. These are referred to as the radial and angular coordinates (r, θ) or (r, θ, φ) in two-dimensional and three-dimensional respectively.

A cylindrical coordinate system is a three-dimensional coordinate system that specifies point positions by the distance from a chosen reference axis, such as an axis at origin 100 (not shown), the direction from the axis relative to a chosen reference direction (typically the positive x-direction), and the distance from a chosen reference plane perpendicular to the axis. The latter distance is given as a positive or negative number depending on which side of the reference plane faces the point. The power, and indeed the origin, of the cylindrical coordinate system is the point where all three coordinates can be given as zero. This is the intersection between the reference plane and the axis.

Recall from above that with Cartesian coordinates, any point in space can be defined by only one set of coordinates. A key difference when using polar coordinates is that the polar system allows a theoretically infinite number of coordinate sets to describe any point. Accordingly, by way of a summary, spherical polar coordinates are likely to be the preferred choice for many modern-day dynamic video games; however, the simplicity of Cartesian coordinates may be utilized on hardware with processing limitations, such as mobile gaming or the like, and cylindrical coordinates may be used in connection with objects that have some rotational symmetry about the longitudinal axis.

Referring back to FIG. 1, the vectors, $$\overrightarrow{P_1P_2} \text{ and } \overrightarrow{P_2P_1}$$

are translation vectors that describe a translation from Player 1 to Player 2, or Player 2 to Player 1, respectively. In Euclidean geometry, a translation is a geometric transformation that moves every point of a figure, shape or space by the same distance in a given direction. A translation can also be interpreted as the addition of a constant vector to every point, or as shifting the origin of the coordinate system. Accordingly, the translation in the video game environment can be applied to the origin position 100, or the position of Player 1.

In classical physics, translational motion is a movement that changes the position of an object, as opposed to rotational. For example, a translation is an operation changing the positions of all points (x, y, z) of an object according to the formula $$(x,y,z) \rightarrow (x+\Delta x, y+\Delta y, z+\Delta z)$$

where (Δx, Δy, Δz) is the same vector for each point of the object. The translation vector (Δx, Δy, Δz) common to all points of the object describes a particular type of displacement of the object, usually called a linear displacement to distinguish it from displacements involving rotational, usually called angular displacements. In some scenarios, a translation vector alone will be sufficient to determine how to correct the positional information; however, in most scenarios, in particular for modern dynamic games such as FPSs, a translation vector is likely to be accompanied by a rotational or rotational vector, which will be described in more detail below.

Figure 2A:
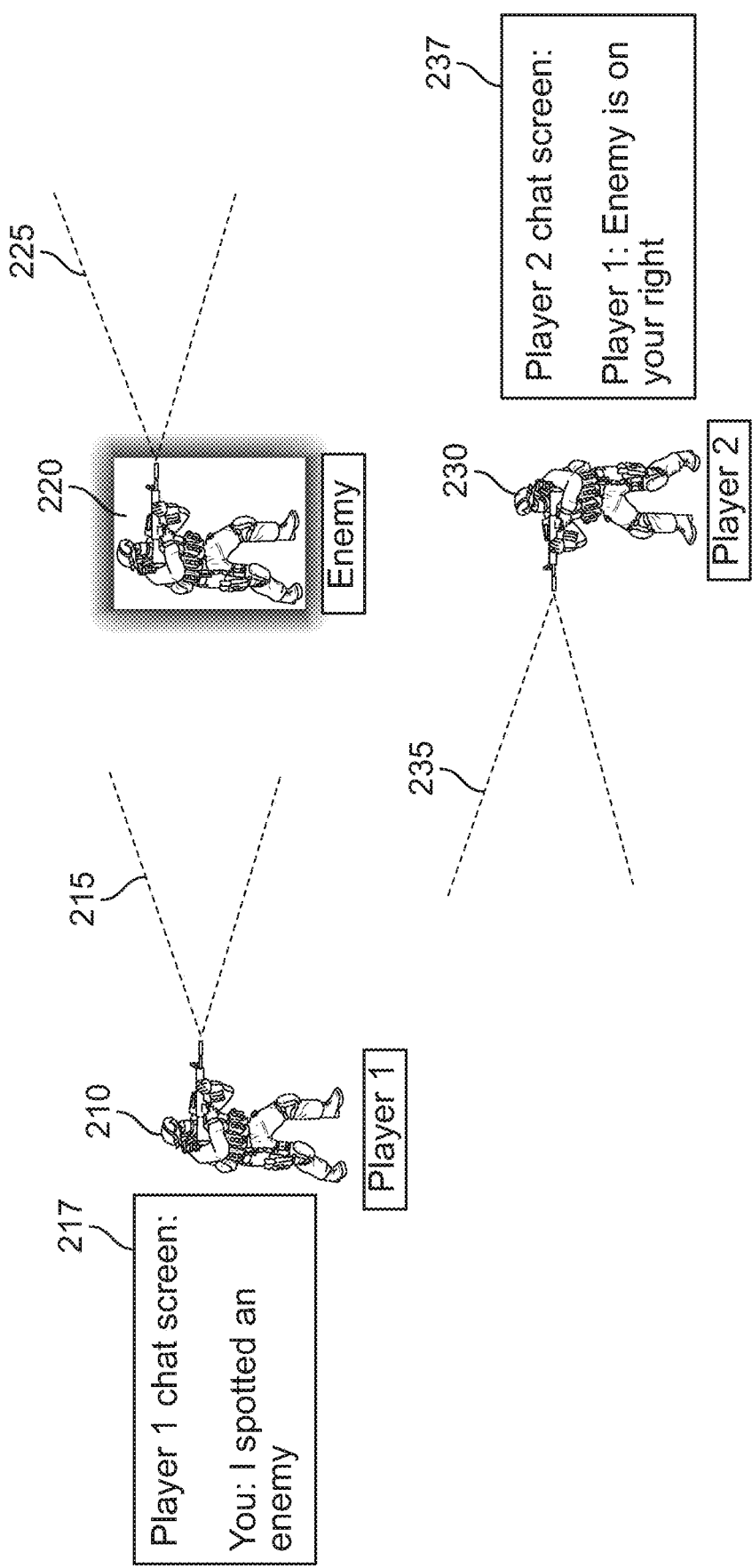
FIG. 2A is an illustrative diagram showing players in a video game environment and their respective fields of view and chat boxes, in accordance with some embodiments of the disclosure.

FIG. 2A is an illustrative diagram showing players in a video game environment and their respective field of views and chat boxes, in accordance with some embodiments of the disclosure. For example, in FIG. 2A, the video game application facilitates intra-game communication in video game environments featuring first-person or third-person FOV. As shown in FIG. 2A, the video game environment is displayed to a first user, Player 1, 210 in a first-person perspective (e.g., FOV 215 of the first user 210). However, the video game application may also render video game environments in a third-person perspective or through the use of virtual reality or augmented reality hardware and/or applications (e.g., as discussed with reference to FIG. 7 below). As referred to herein, "a video game environment" may include any surroundings or conditions in which a video game occurs. For example, an environment may be a three-dimensional environment (e.g., featuring three-dimensional models and/or textures) or the video game environment may be a virtual or augmented reality environment (e.g., featuring a virtual world or a view in which computer-generated images are superimposed on a user's view of the real world). As referred to herein, "a video game" may include any electronic presentation that involves interaction with a user interface to generate audio/visual feedback on a video device such as a TV screen, wearable electronic device, and/or computer monitor.

As shown in FIG. 2A, in a video game environment having a first-person perspective, the line of sight of the users 210, 220, 230 may correspond to the eye level of their avatar in the video game environment. As referred to herein, "a line of sight" may refer to a straight line along which an observer (e.g., the first user) has unobstructed vision within the field of view 215, 225, 235, of the avatar. The field of view may include a range as indicated by a particular angle (e.g., mimicking the wide-angle view that a human may see). The video game application may determine the line of sight of a user based on a predetermined angle (or angles in multiple orientations) as well as the presence of in-game objects that may obstruct the line of sight (e.g., the second user, shown as Player 2, 230 is facing a different direction from the first user 210, and therefore cannot see the enemy avatar 220).

Furthermore, the system (e.g., the video game application, or methods used therein) may determine the location of an object of interest by determining line-of-sight boundaries, within the video game environment, from a perspective of the first user 210 at the first location (e.g., determining the coordinates that define the surfaces of objects and boundaries in the video game environment). The video game application may determine the first trajectory from the first location to the second location within the video game environment. For example, by determining the trajectory from the first location to the second location, the video game application may determine both the trajectory of pointer 106 of the on-screen graphic, line-of-sight boundaries between the user and an object, and/or a distance between the first and second location.

After the first user 210 spots the enemy avatar 220 in their field of view 215, the first user informs the second user 230, as shown by chat screen 217. Chat screen 217 shows that the first player 210 has indicated that they have "spotted an enemy," which is referred to as the first communication. The first communication has little to no information that is useful to the second user 230, other than that an enemy has been spotted. Unless the second user 230 knows where the first user 210 is, and the direction the first user 210 is facing (i.e., the boundaries of their field of view 215) the second user 230 does not know where the enemy avatar 220 is, relative to their position.

In an embodiment, an analysis of the communication is performed to identify positional information and extract relevant information, such as relative directions (e.g., to my left/right, in front of/behind me, above/below me, etc.), distance from the speaker, and positional information with respect to landmarks (e.g., behind the water tower, in the upstairs window, etc.). If no directional information is present in the first communication, then an object referred to in the first communication can be identified in the field of view 215 of the first user 210. In this example, enemy 220 is identified in the field of view and therefore the system can determine the position information is "in front," even though the first user 210 did not say that. In some examples, the analysis of the communication extracts further information, such as an enemy name/character, enemy health status, a weapon used by an enemy, a movement characteristic of an enemy (e.g., still/camping-out, running, riding a particular vehicle, etc.), another context regarding an enemy purpose (e.g., guarding a base/flag, planting a bomb, providing support/healing, etc.), and/or a timestamp of the communication.

Accordingly, the video game application may detect first positional information from the first communication. Continuing the above example, the first communication from the first user 210 is, "I spotted an enemy," which does not comprise positional information, as such, but the enemy is identified in the field of view 215 of the first user 210. Therefore, the positional information can be determined as "in front of" the first user 210. Next, the positional information is corrected to reflect, relative to the second user 230, the position of the enemy avatar 220. For example, as shown in chat screen 237, the second user 230 (Player 2) gets the message, "Player 1: Enemy is on your right." The correction of the positional information is based on at least the first translation vector, as described above with reference to FIG. 1. However, by way of summary, as the video game application has already determined the translation of the positional vector of Player 1 to Player 2, this can be used to determine the instruction to transcribe the positional information from Player 1's perspective to Player 2's perspective. Further, and in some instances, optionally, the corrected positional information is transmitted 237 to the second user.

In the example of FIG. 2A, only a rotational vector is needed. Accordingly, it should be understood that the term "translation vector" is sometimes used herein as a label to describe not only a translation in an x, y, and/or z-direction of the second user's avatar 230 but also an accompanying rotational and/or an additional rotational vector, as will be described in more detail below, with reference to FIG. 2B.

Figure 2B:
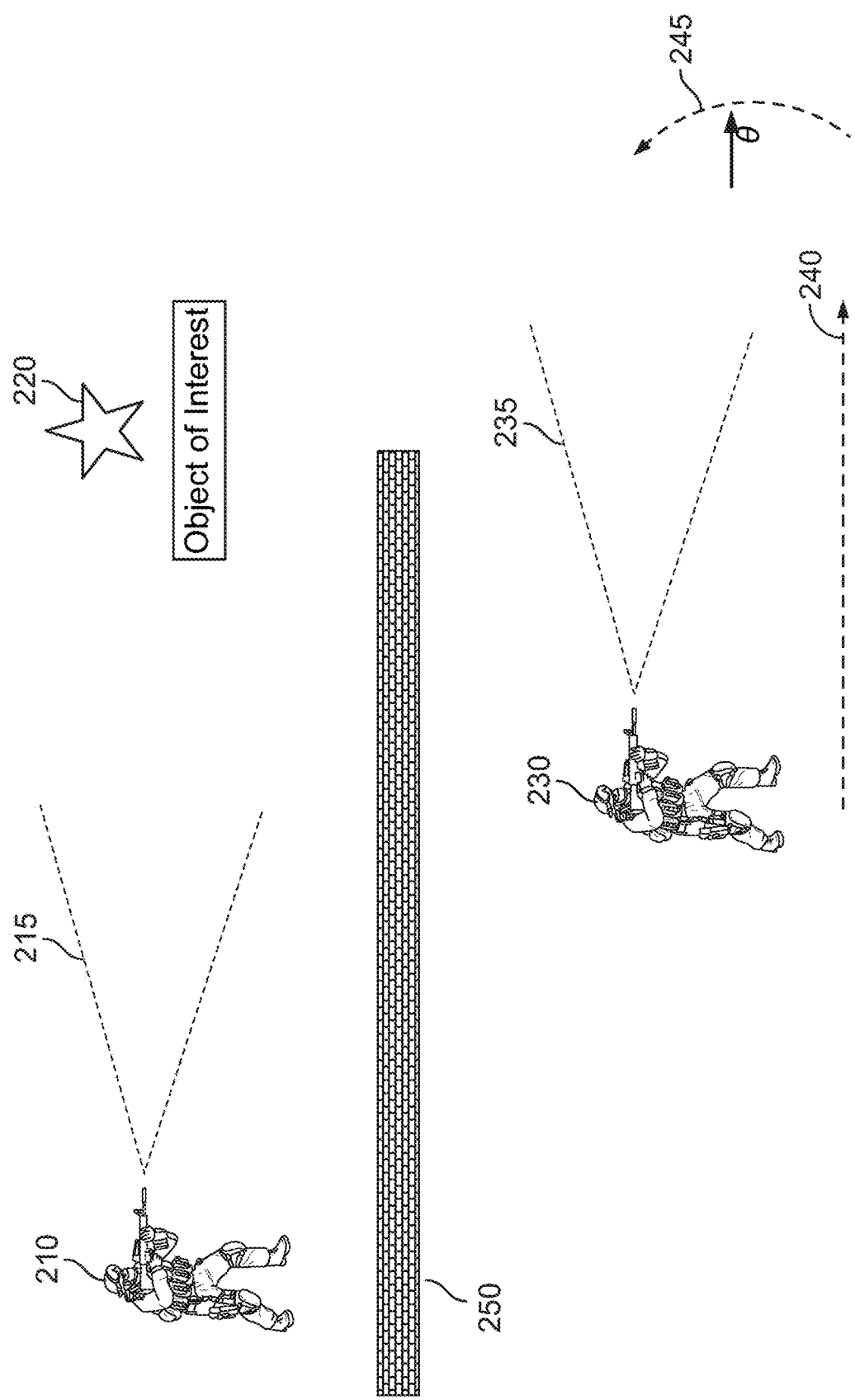
FIG. 2B is an illustrative diagram showing players in a video game environment and their respective field of views and an object of interest with an obstruction in the way, in accordance with some embodiments of the disclosure.

FIG. 2B is an illustrative diagram showing players in a video game environment and their respective field of views and an object of interest with an obstruction in the way, in accordance with some embodiments of the disclosure. In some examples, after observing an object of interest 220 in the field of view 215, the first user 210 will inform their teammates, for example, the second user 230, as described above with reference to FIG. 2A. However, in this scenario, the object of interest 220 is not in the field of view 235 of the second user 230 because of obstruction 250. Therefore, when applying a translation vector 240, the second user will still be facing the wrong direction and their field of view 235 will still not have the object of interest 220 in it. Therefore, in most scenarios, the translation vector is also likely to comprise a rotational element, or rotational vector 245. In some examples, the translation vector 240 and rotational vector 245 are applied separately or in parallel to arrive at a combined translation vector.

In mathematics, the axis—angle representation of a rotational parameterizes a rotational in a three-dimensional Euclidean space by two quantities: a unit vector e indicating the direction of an axis of rotational, and an angle $\theta$ describing the magnitude of the rotational about the axis. In the present examples, the unit vector e, the axis of rotational, will be parallel to the avatar's "height" parameter, which is perpendicular to the field of view. However, other axes of rotation may be selected, for example, the axis of rotational may be parallel to the positional vector of the first or second user. In this way, a rotational vector 245 can be applied directly to the positional vector 240 to result in a single vector.

Only two numbers, not three, are needed to define the direction of a unit vector e rooted at the origin because the magnitude of e is constrained (see vector below). For example, the elevation and azimuth angles of e suffice to locate it in any particular Cartesian coordinate frame. The angle and axis determine a transformation that rotates three-dimensional vectors (e.g., positional vectors of the first and second users). The axis—angle representation is equivalent to the more concise rotational vector, also called the Euler vector. In this case, both the rotational axis and the angle are represented by a vector codirectional with the rotational axis whose length is the rotational angle θ, $$\vec{\theta} = \theta e$$

Many rotational vectors correspond to the same rotational. In particular, a rotational vector of length θ+2πM, for any integer M, encodes exactly the same rotational as a rotational vector of length θ. Thus, there are at least a countable infinity of rotational vectors corresponding to any rotational. Furthermore, all rotationals by 2πM are the same as no rotational at all, so, for a given integer M, all rotational vectors of length 2πM, in all directions, constitute a two-parameter uncountable infinity of rotational vectors encoding the same rotational as the zero vector. These relationships are taken into account when inverting the exponential map, that is, when finding a rotational vector that corresponds to a given rotational matrix if applying the present disclosure with matrices rather than vectors.

Figure 3A:
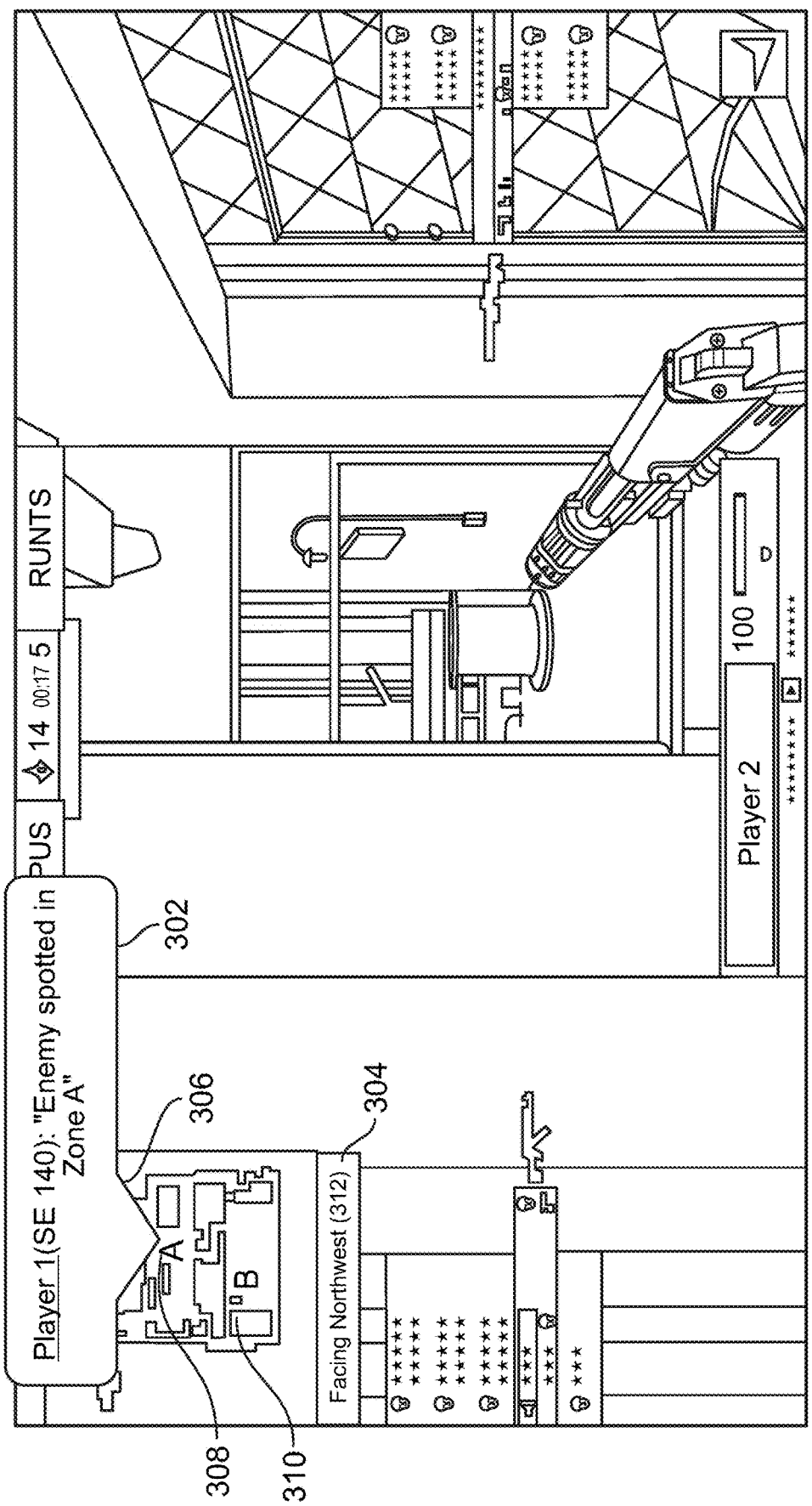
FIG. 3A shows an example view of a video game environment and on-screen graphics, in accordance with some embodiments of the disclosure.

FIG. 3A shows an example view of a video game environment and on-screen graphics, in accordance with some embodiments of the disclosure. In FIG. 3A, the video game application further determines whether or not to present an on-screen graphic, despite also correcting the positional information provided by the first user. For example, the video game application may determine a distance, within the video game environment, between first location 308 and second location 310. The distance between the two locations can be determined based on the absolute length between first location 308 and second location 310 (e.g., as the crow flies) in the video game environment. Alternatively or additionally, the number of, and composition of, objects between first location 308 and second location 310 may affect the determined distance. For example, the relative distance between two locations in the video game environment may be determined to be greater if multiple objects (e.g., walls) are situated between first location 308 and second location 310.

In FIG. 3A, the video game application compares the distance between first location 308 and second location 310 to a threshold distance. For example, the threshold distance may correspond to a minimum distance in which on-screen graphics (e.g., on-screen graphic 302) are generated relative to a trajectory between the locations of the first and second user (e.g., first location 308 and second location 310). In response to the video game application determining that the distance is within the threshold distance, the video game application may determine to generate for display an on-screen graphic 302 relative to a trajectory between the locations of the first and second user (e.g., as shown in FIGS. 2A-2B). Alternatively, in response to the video game application determining that the distance is equal to or exceeds the threshold distance, the video game application may determine not to generate for display on-screen graphic 302.

In FIG. 3A, the on-screen graphic displays the corrected positional information, which, in the example shown, is provided in the form of additional positional information: direction and distance information. The direction and distance information, "SE140, 12m" represents that the subject of the corrected positional information "Enemy spotted in Zone A" is southeast, at a bearing of 140 degrees, 12 meters away. Player 2's directional information 304 is provided such that Player 2 can make their way to the callout target, Zone A.

In some examples, the systems and methods use natural language understanding (NLU) or natural language processing (NLP) algorithms to learn and process vocabulary and map locations used by the players in a game. The players may also provide and edit a list of terms and vocabulary and may tag locations within a game map with certain names. The video game application, systems, and methods use NLU training and user-defined information to analyze the content of the communication and determine where to place a pin, or where the location of interest or object of interest is located. For example, in NLU, various ML algorithms are used to identify the sentiment, perform name entity recognition (NER), process semantics, etc. NLU algorithms often operate on a text that has already been standardized by text pre-processing steps, so permitting the players to add to this library enables different teams or video games, who may already have a commonly used language, to improve further the communication between users.

Figure 3B:
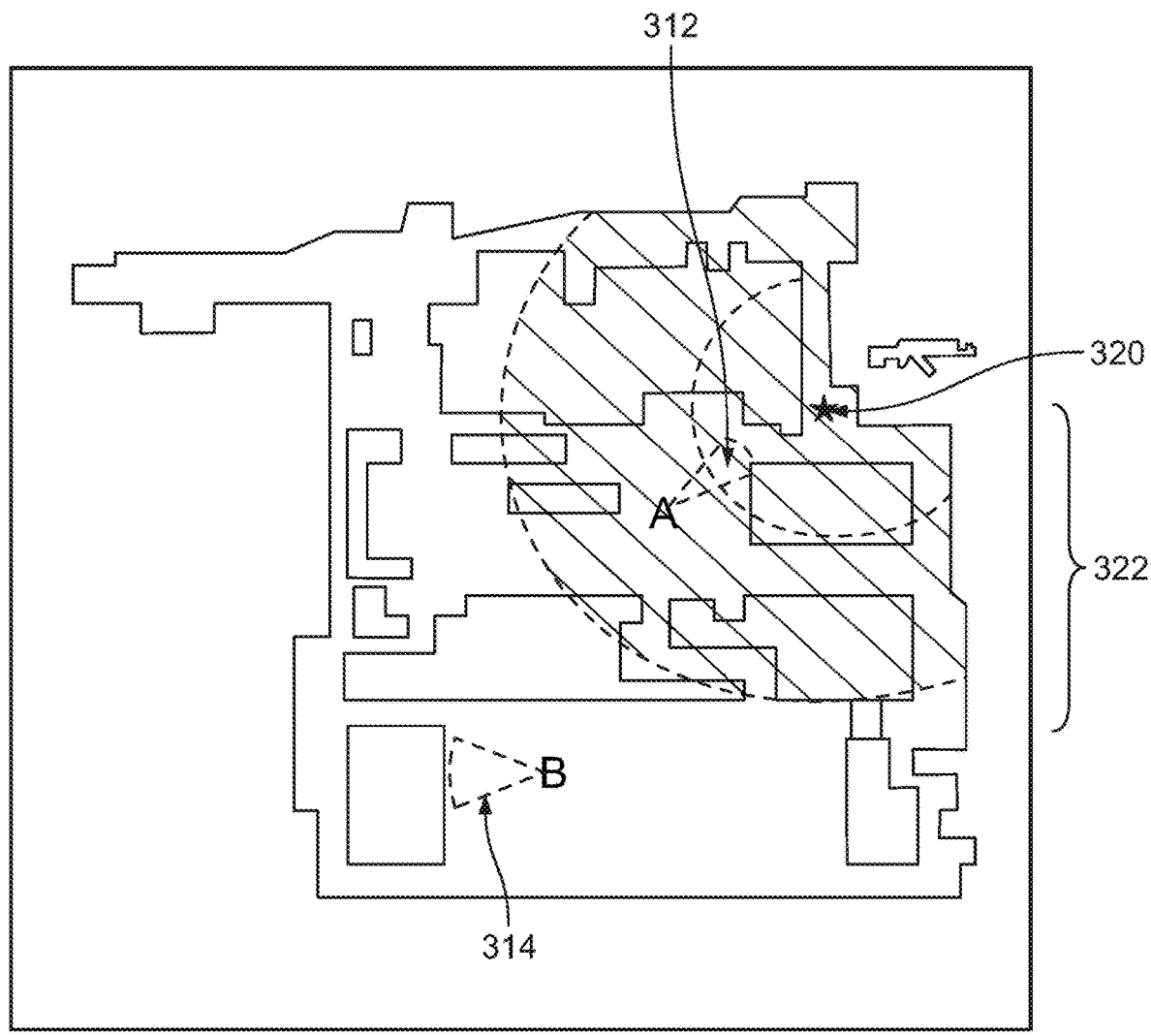
FIG. 3B shows an example view of an in-game map in a video game environment with on-screen graphics, in accordance with some embodiments of the disclosure.

FIG. 3B shows an example view of an in-game map in a video game environment with on-screen graphics, in accordance with some embodiments of the disclosure. In FIG. 3B, there is illustrated an example of a video game application, in which locations and FOVs of a Player A 312 and a Player B 314 are shown in an on-screen map. In this example, Player A provides a communication identifying an enemy 320 in front of them at the end of a corridor behind a wall. In practice, in-game callouts should be concise and are based on a unique vocabulary (slang terms, shorthand, lingo, location names, etc.) that are particular to a player, team, game, game map, etc. So, in this scenario, Player A may say: "Viper Low AK Hall End." In this example, Viper refers to an enemy avatar with particular characteristics, Low refers to the enemy health level, AK refers to the enemy's weapon, and Hall End refers to a map location.

In the example of FIG. 3B, an on-screen graphic associated with the enemy location 320 has been generated with a radius 322. In this example, the on-screen graphic is augmented to increase in size as a function of time passed since the first communication from Player A, "Viper Low AK Hall End." Moreover, the rate of increase in size may be based on information extracted from the first communication. In addition, the on-screen graphic can be removed when the time passed reaches a threshold. For example, the video game application may, in the first instance, determine the size of the on-screen graphic based on a distance, within the video game environment, to a spotted enemy avatar or object of interest, as described above with reference to FIG. 3A. In such cases, user interactions from users closer to the first user may (e.g., imitating the real-world condition that sounds are heard as louder the closer the user is to the source of the sound) than similar user interactions from users farther away. However, over time, the confidence of the exact location of the enemy avatar 322 will decrease, as the enemy avatar may move out of sight and continue moving. Accordingly, the radius of the on-screen graphic is increased over time to show that the object of interest is likely still within a zone, but exactly where within the zone is unknown. After the radius reaches a maximum size threshold (which equates to a maximum time threshold) the on-screen graphic is removed.

For a positional vector r that is a function of time t, the time derivatives can be computed with respect to t. In the video game environment, the maximum velocity of the user's avatars can be used to determine the rate of increase of radius 322. For example, an avatar's velocity and the rate of increase of the radius can be linked by the equation:

$$v = \frac{dr}{dt}$$

where dr is an infinitesimally small-displacement vector. To further improve the model, higher-order derivatives can improve approximations of the original displacement function, such as the acceleration (a) and jerk (j) functions (these names for the first, second and third derivatives of position are commonly used in kinematics):

$$a = \frac{dv}{dt} = \frac{d^2r}{dt^2}$$

$$j = \frac{da}{dt} = \frac{d^2v}{dt^2} = \frac{d^3r}{dt^3}$$

The on-screen graphic may be, for instance, a ring/dome-shape or an abstract two-dimensional or three-dimensional boundary that expands from the ping location as time passes from the time of the communication. The rate of the expansion and the contours of the boundary may also be based on the information extracted from the communication, such as running speed and/or jumping/climbing capabilities of different enemy avatars or movement characteristics of a vehicle the enemy was occupying, and input into the above equations to determine the rate of increase of the radius 322. In-game environment or map features, such as possible travel paths and obstacles around the pin location, may also have an impact.

Different types of pins and visual effects may be used to represent different game instruments/contexts and characteristics. For instance, different shapes can be used to represent different classes of characters (tankers, melee, ranged, support, etc.); different colors or borders around a pin may represent an enemy's health; a weapon icon may be placed near the pin, etc.

Figure 4:
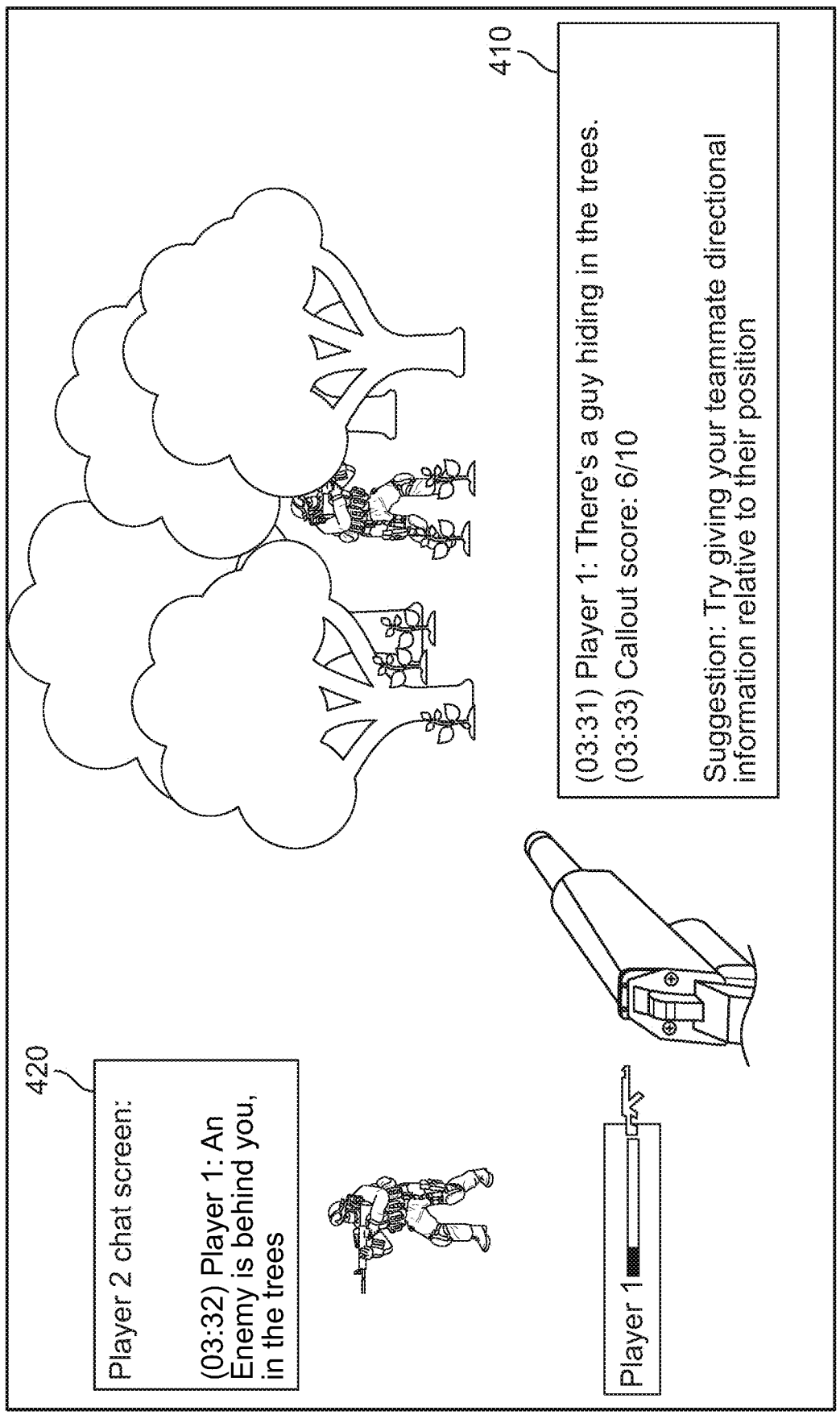
FIG. 4 shows an example view of a video game environment and a callout score and suggestion, in accordance with some embodiments of the disclosure.

FIG. 4 shows an example view of a video game environment and a callout score and suggestion, in accordance with some embodiments of the disclosure. In FIG. 4, the positional information given by the first user to the second user is analyzed and provided with a callout score. For example, Player 1's chat box 410 shows that the information they provided was, "there's a guy hiding in the trees.", which was given a callout score of 6/10. The first user was also provided with a feedback (e.g., a suggestion) to improve in their call-outs in the future, "suggestion: try giving your teammate directions relative to their position." In some examples, the on-screen visualization (e.g., by highlighting or underlining keywords) of relevant information in the callout can be made, which helps to train players to provide better callouts-more concise, precise, and useful information-to teammates.

Player 2's chat box 420 shows the corrected positional information, "Player 1: An enemy is behind you, in the trees." Thus, from Player 2's perspective, no change in their experience is made. In some examples, the callout score can provide the user's avatar in-game experience or rewards, encouraging the user to improve their callouts.

In some examples, the callout score can be improved by not only providing directional information that is relative to the second user but also by highlighting another game context, for example, an enemy or some other object, such as a bomb, flag, trap, item, weapon, vehicle, power-up, etc. Examples of game contexts may include sounds relating to a game instrument, such as enemy footsteps or a ticking bomb. Therefore, different combinations of techniques to process and convert the positional information of the context, and to convey the converted positional information, are provided.

In addition, in some examples (not shown) the callout score is provided as a summary at the end of the video game gameplay to each user. The callout score summary can be provided to all users, so that users can see the most common corrections being made in a match, or to players individually with a personalized callout score and individualized feedback, such as the feedback in FIG. 4.

Figure 5A:
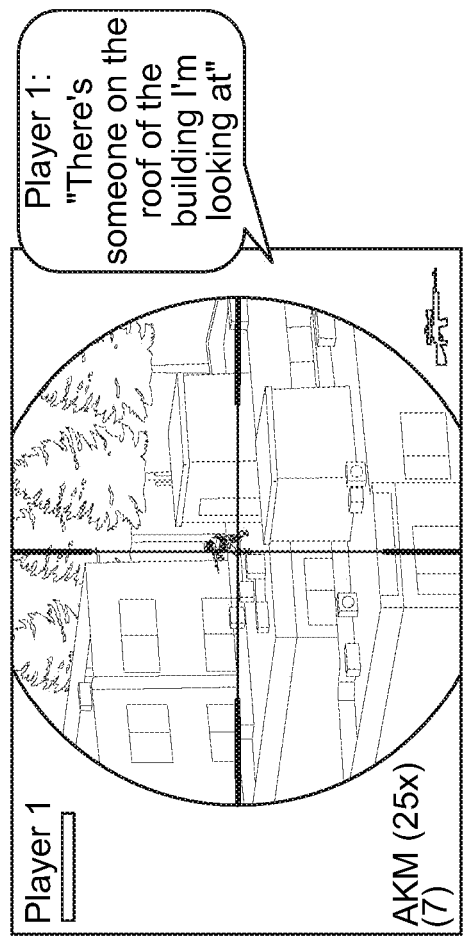
FIGS. 5A and 5B show an example view of a video game environment and on-screen graphics, in accordance with some embodiments of the disclosure.
Figure 5B:
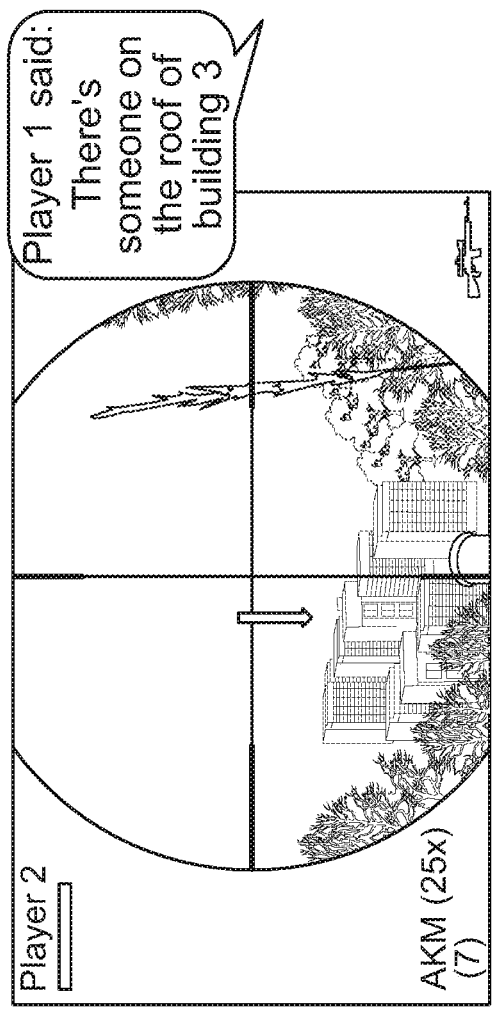

FIGS. 5A and 5B show example views of a video game environment and on-screen graphics, in accordance with some embodiments of the disclosure. In FIGS. 5A and 5B, the corrected positional information may be provided by the in-game chat system, in conjunction with an on-screen graphic, to aid, for example, new users to the game. For example, a first user, Player 1, may not know the language and terminology commonly used in the video game environment. As shown, in FIG. 5A, the first user, Player 1, provides the positional information, "There's someone on the roof of the building I'm looking at," which, in this particular example, is commonly referred to as building 3—however, due to the FOV of Player 1, the system may determine there is an uncertainty in the first user's reference, as the buildings are relatively close together. Therefore, in FIG. 5B, for the second user, an on-screen graphic is used to help assist with the corrected positional information.

In some examples, the video game application may compare a user interaction to a database listing presentation formats associated with different user interactions to determine a presentation format of an on-screen graphic associated with the user interaction. For example, the video game application may have presentation formats that are specific to particular user interactions (e.g., red boxes for audio communications, custom designs for specific in-game actions, etc.). By providing the different presentation formats, the intuitiveness of the cues is further increased.

In FIG. 5A, Player 1 has focused on an in-game object, which results in user interaction with the object, as described above. As Player 1's avatar zooms in and interacts with the video game environment, Player 1 may call out an object or boundary to Player 2. For example, a video game application may incorporate and/or have access to a detection module that may determine coordinates (e.g., x, y, and z spatial coordinates and/or any other suitable coordinate system) associated with the user interaction and the positional vector of the first and second user. The coordinates may then be used by the video game application to determine the bounds of the video game environment and/or objects within the video game environment that were interacted with by the user, for determining the object of interest that the user interacted with, prior to receiving the first communication.

After the video game application determines one or more portions of a video game object or environment have been interacted with, the video game application may then expect the first communication, and pre-calculate the current positional vector for the first and/or second user. For example, the video game application may detect an avatar interacting with a wall in the video game environment. In response, the video game application may determine a first positional vector of a first user within a video game environment and determine a second positional vector of a second user within the video game environment. In some embodiments, the video game application may detect a trajectory associated with a user interaction (e.g., performed by the user) by monitoring the path and velocity associated with the user interaction (e.g., the movement of a user while the user is within a predetermined proximity to a video game object (e.g., a wall), which is then used in the calculation of the translation and/or rotational vector.

Figure 6:
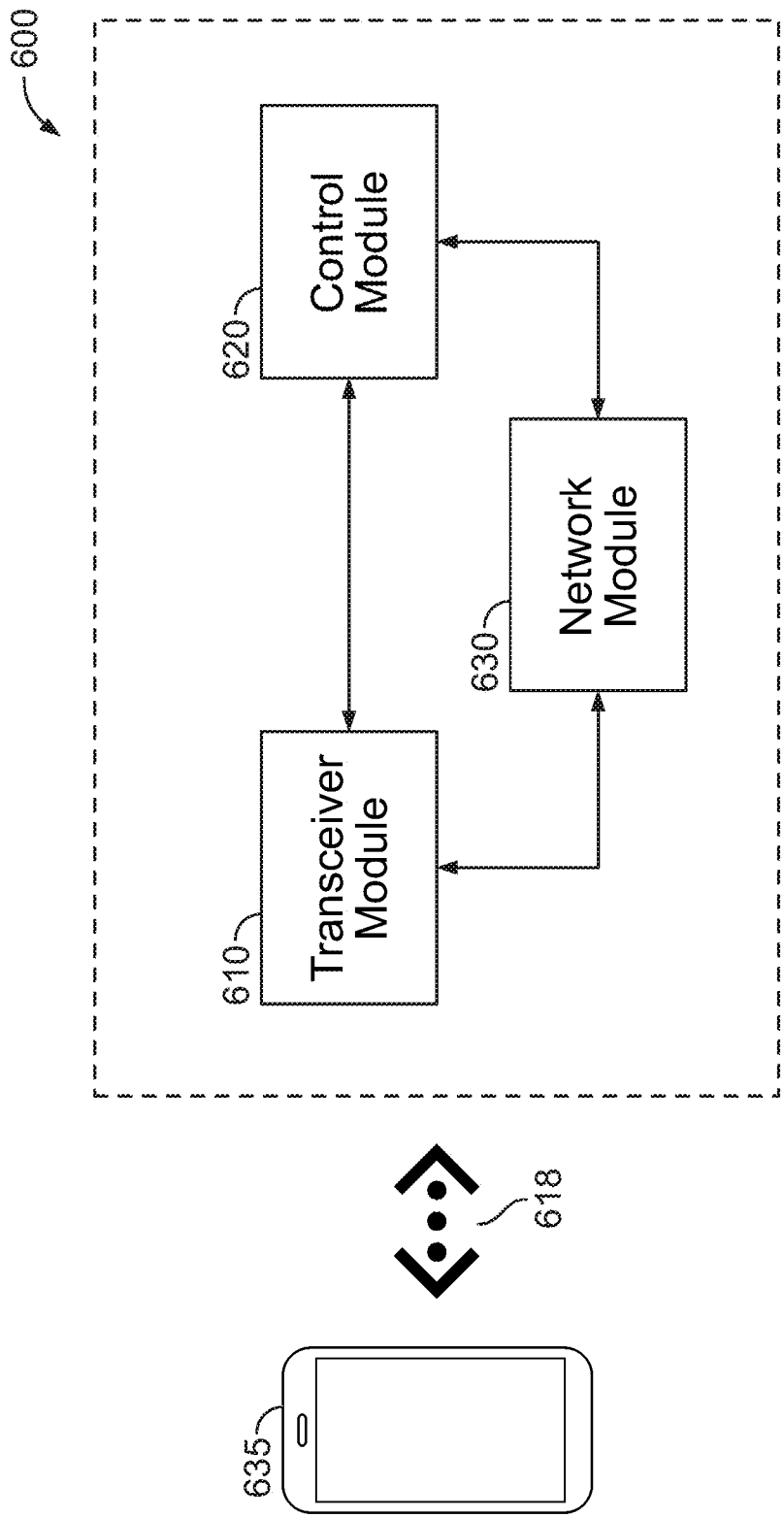
FIG. 6 illustrates an exemplary media transmission device, in accordance with some embodiments of the disclosure.

FIG. 6 illustrates an exemplary media device 600, in accordance with some embodiments of the disclosure. The media device 600 comprises a transceiver module 610, a control module 620, and a network module 630. The media transmission system may communicate with an additional user device 635, such as a home gateway, smartphone, video game controller, or other smart devices. In some examples, the additional user device 635 is the user's main device for interacting with the video game environment, and the media device 600 comprises the components for carrying out the processing, in particular when the additional user device is limited in processing capabilities.

In some examples, the transceiver module communicates with a second user device 635 via communication link 618. The communication link 618 between the transceiver module 610 and the second user device 635 may comprise a physical connection, facilitated by an input port such as a 3.5 mm jack, RCA jack, USB port, ethernet port, or any other suitable connection for communicating over a wired connection or may comprise a wireless connection via BLUETOOTH, Wi-Fi, WiMAX, Zigbee, GSM, UTMS, CDMA, TDMA, 3G, 4G, 4G LTE, 5G or other wireless transmissions as described by the relevant 802.11 wireless communication protocols.

In some examples, the second user device 635 may receive the natural language input (e.g., the first communication between the first user and the second user) and then transmit the natural language input to the media device 600. However, these examples are considered to be non-limiting and other combinations of the features herein being spread over two or more devices are considered within the scope of this disclosure. For example, each of the transceiver module, the network module, and the control module may be separate internet of things (IoT) devices that each carry out a portion of the methods herein. Collectively, these devices may be referred to as a system. In some examples, the natural language input may be stored on a server such as server 702.

The media device 600 and/or user device 635 may collectively be an augmented reality or virtual reality headset. In such an embodiment, an eye contact detection component, which may be a part of control module 620, may be used to identify the gaze point of a user, in order to determine whether or not a user is focusing on a particular portion of a video game environment and/or determine a line of sight or field of view of a user and/or avatar. For example, the location upon which a user's eyes are focused may determine whether or not the video game application selects one object over another.

Figure 7:
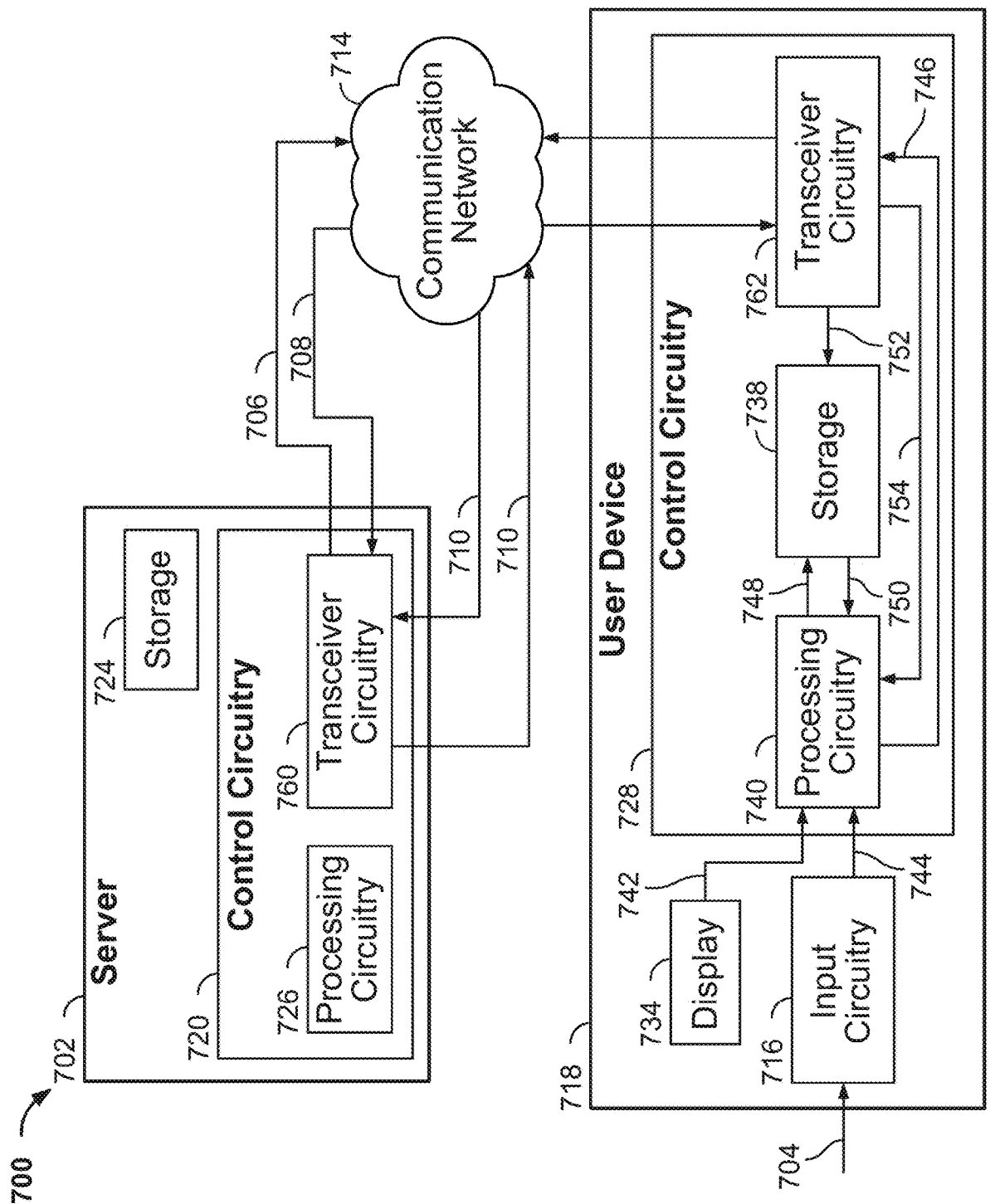
FIG. 7 is a block diagram representing devices, components of each device, and data flow therebetween for a system for providing smart communications in a video game environment, in accordance with some embodiments of the disclosure.

FIG. 7 is a block diagram representing devices, components of each device, and data flow therebetween for providing smart communications in a video game environment, in accordance with some embodiments of the disclosure. System 700 is shown to include a user device 718, a server 702, and a communication network 714. It is understood that while a single instance of a component may be shown and described relative to FIG. 7, additional instances of the component may be employed. For example, server 702 may include, or may be incorporated in, more than one server. Similarly, communication network 714 may include, or may be incorporated in, more than one communication network.

Server 702 is shown communicatively coupled to user device 718 through communication network 714. While not shown in FIG. 7, server 702 may be directly communicatively coupled to user device 718, for example, in a system absent or bypassing communication network 714. User device 718 may be thought of as the media device 600 or 635. as described above.

Communication network 714 may comprise one or more network systems, such as, without limitation, an internet, LAN, Wi-Fi, or other network systems suitable for audio processing applications. In some embodiments, system 700 excludes server 702, and functionality that would otherwise be implemented by server 702 is instead implemented by other components of system 700, such as one or more components of communication network 714. In other embodiments, server 702 works in conjunction with one or more components of a communication network 714 to implement certain functionality described herein in a distributed or cooperative manner. Similarly, in some embodiments, system 700 excludes user device 718, and functionality that would otherwise be implemented by the user device 718 is instead implemented by other components of system 700, such as one or more components of communication network 714 or server 702 or a combination of components. In still other embodiments, the user device 718 works in conjunction with one or more components of communication network 714 or server 702 to implement certain functionality described herein in a distributed or cooperative manner.

The user device 718 control circuitry 728, display 734, and input/output circuitry 716. Control circuitry 728, in turn, transceiver circuitry 762, storage 738, and processing circuitry 740. In some embodiments, user device 718 or control circuitry 728 may be configured as user device 635 of FIG. 6.

Server 702 includes control circuitry 720 and storage 724. Each of storage 724 and 738 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each storage 724, 738 may be used to store various types of content, media data, and or other types of data (e.g., they can be used to store media content such as audio, video, and advertisement data). The non-volatile memory may also be used (e.g., to launch a boot-up routine and other instructions). Cloud-based storage may be used to supplement storages 724, 738 or instead of storages 724, 738. In some embodiments, the pre-encoded or encoded media content, in accordance with the present disclosure, may be stored on one or more of storages 724, 738.

In some embodiments, control circuitry 720 and/or 728 executes instructions for an application stored on the memory (e.g., storage 724 and/or storage 738). Specifically, control circuitry 720 and/or 728 may be instructed by the application to perform the functions discussed herein. In some implementations, any action performed by control circuitry 720 and/or 728 may be based on instructions received from the application. For example, the application may be implemented as software or a set of executable instructions that may be stored in storage 724 and/or 738 and executed by control circuitry 720 and/or 728. In some embodiments, the application may be a client/server application where only a client application resides on user device 718, and a server application resides on server 702.

The application may be implemented using any suitable architecture. For example, it may be a stand-alone application wholly implemented on user device 718. In such an approach, instructions for the application are stored locally (e.g., in storage 738), and data for use by the application is downloaded periodically (e.g., from an out-of-band feed, from an internet resource, or using another suitable approach). Control circuitry 728 may retrieve instructions for the application from storage 738 and process the instructions to perform the functionality described herein. Based on the processed instructions, control circuitry 728 may determine a type of action to perform in response to input received from the input/output path (or input/output circuitry) 716 or the communication network 714. For example, in response to a receiving a natural language input on the user device 718, control circuitry 728 may perform the steps of processes as described with reference to various examples discussed herein.

In client/server-based embodiments, control circuitry 728 may include communication circuitry suitable for communicating with an application server (e.g., server 702) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 714). In another example of a client/server-based application, control circuitry 728 runs a web browser that interprets web pages provided by a remote server (e.g., server 702). For example, the remote server may store the instructions for the application in a storage device. The remote server may process the stored instructions using circuitry (e.g., control circuitry 728) and/or generate displays. User device 718 may receive the displays generated by the remote server and may display the content of the displays locally via display 734. This way, the processing of the instructions is performed remotely (e.g., by server 702) while the resulting displays, such as the display windows described elsewhere herein, are provided locally on the user device 718. User device 718 may receive inputs from the user via input circuitry 716 and transmit those inputs to the remote server for processing and generating the corresponding displays. Alternatively, user device 718 may receive inputs from the user via input circuitry 716 and process and display the received inputs locally, by control circuitry 728 and display 734, respectively.

It is understood that user device 718 is not limited to the embodiments and methods shown and described herein. In non-limiting examples, the user device 718 may be a television, a Smart TV, a digital storage device, a digital media receiver (DMR), a digital media adapter (DMA), a streaming media device, a personal computer (PC), a laptop computer, a tablet computer, a PC media server, a PC media center, a handheld computer, a personal digital assistant (PDA), a mobile telephone, a portable gaming machine, a smartphone, a virtual reality headset, an augmented reality headset, a mixed reality headset, or any other device, client equipment, or wireless device, and/or a combination of the same capable of engaging with a video game environment.

Control circuitry 720 and/or 728 may be based on any suitable processing circuitry such as processing circuitry 726 and/or 740, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 720 and/or control circuitry 728 are configured to implement a video game environment, such as systems, or parts thereof, that perform various processes described herein.

User device 718 receives a user input 704 at input circuitry 716. For example, user device 718 may receive a user input like a user swipe, user touch, or input from peripherals such as a keyboard and mouse, gaming controller, or the like. It is understood that user device 718 is not limited to the embodiments and methods shown and described herein. In non-limiting examples, the user device 718 may be a Smart TV, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, virtual reality headset, mixed reality headset, an augmented reality headset, or any other television equipment, computing equipment, or wireless device, and/or combination of the same.

User input 704 may be received from a user selection-capturing interface that is separate from device 718, such as a remote-control device, trackpad, or any other suitable user movement-sensitive or capture devices, or as part of device 718, such as a touchscreen of display 734. Transmission of user input 704 to user device 718 may be accomplished using a wired connection, such as an audio cable, USB cable, ethernet cable, or the like attached to a corresponding input port at a local device, or may be accomplished using a wireless connection, such as BLUETOOTH, Wi-Fi, WiMAX, ZIGBEE, GSM, UTMS, CDMA, TDMA, 3G, 4G, 4G LTE, 5G, or any other suitable wireless transmission protocol. Input circuitry 716 may comprise a physical input port such as a 3.5 mm audio jack, RCA audio jack, USB port, ethernet port, or any other suitable connection for receiving audio over a wired connection, or may comprise a wireless receiver configured to receive data via BLUETOOTH, Wi-Fi, WiMAX, ZIGBEE, GSM, UTMS, CDMA, TDMA, 3G, 4G, 4G LTE, 5G, or other wireless transmission protocols.

Processing circuitry 740 may receive input 704 from input circuitry 716. Processing circuitry 740 may convert or translate the received user input 704 which may be in the form of gestures or movement to digital signals. In some embodiments, input circuitry 716 performs the translation to digital signals, which are then used in processing. In some embodiments, processing circuitry 740 (or processing circuitry 726, as the case may be) carries out disclosed processes and methods.

Figure 8:
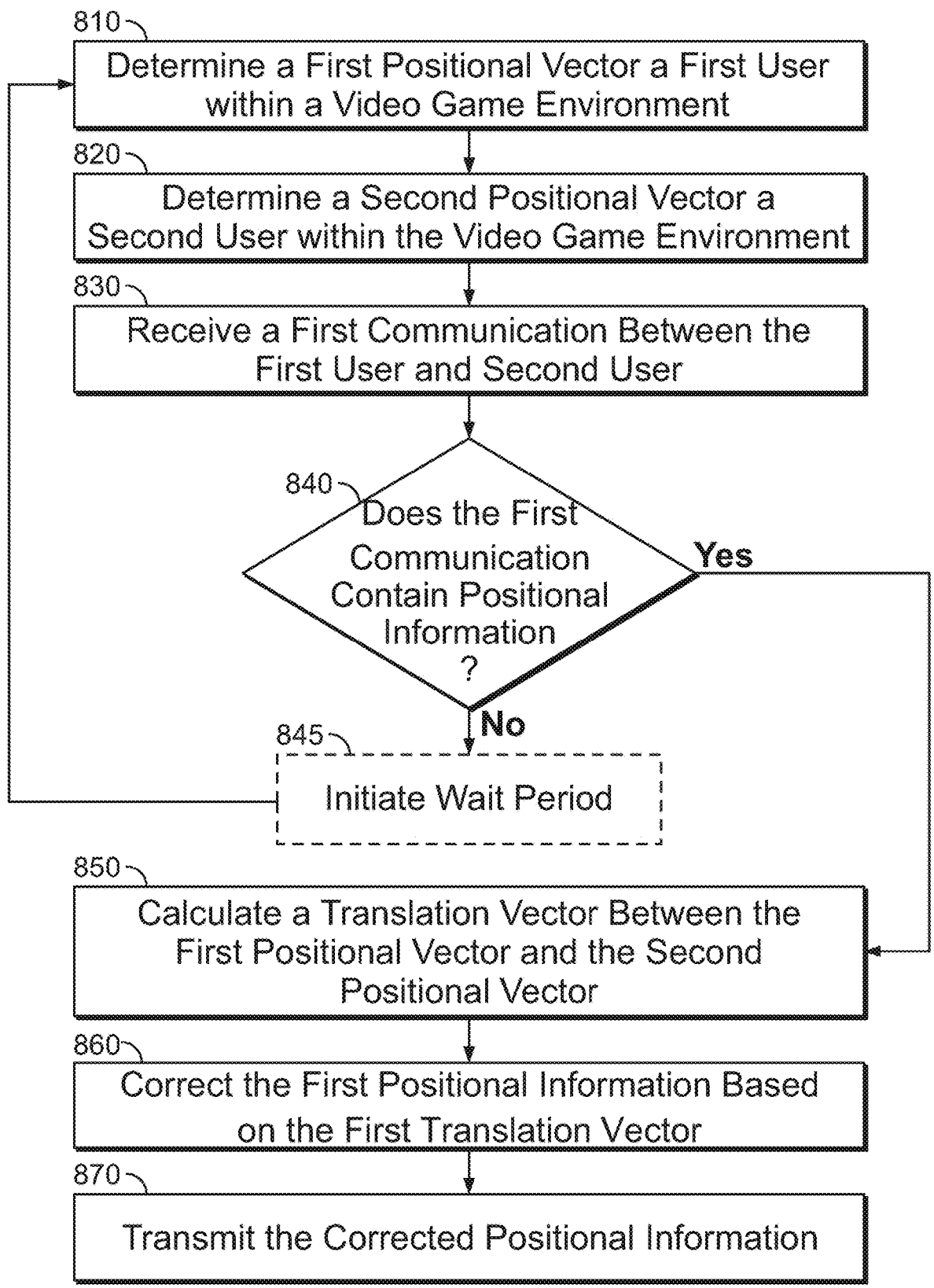
FIG. 8 is an illustrative flowchart of a process for providing smart communications in a video game environment, in accordance with some embodiments of the disclosure.

FIG. 8 is an illustrative flowchart of a process for providing smart communications in a video game environment, in accordance with some embodiments of the disclosure. It should be noted that process 800 or any step thereof could be performed on, or provided by, any of the devices shown in FIGS. 6 and 7. In addition, one or more steps of process 800 may be incorporated into or combined with one or more steps of any other process or embodiment (e.g., process 900 (FIG. 9)).

At step 810, the video game application determines a first positional vector of a first user within a video game environment. The determination may be carried out using control circuitry (e.g., via control circuitry 720 (FIG. 7)). At step 820, the video game application determines a second positional vector of a second user within the video game environment (e.g., via control circuitry 720 (FIG. 7)). For example, relative to an origin point (e.g., origin 100 of FIG. 1) in the video game environment, the location and distance of the user (or the user's avatar) within the boundaries of the game environment are determined. In practice, this is carried out by determining the coordinates of an avatar relative to the origin, for example, Player 1's avatar is at $(x_1, y_1, z_1)$, the positional vector is therefore the $$\vec{OP_1} = x_1\ \hat{i} + y_1\ \hat{j} + z_1\ \hat{k},$$

where $\hat{i}$, $\hat{j}$, and $\hat{k}$ are orthogonal unit vectors; the same can be done for Player 2's avatar, mutatis mutandis.

At step 830, the video game application receives a first communication between the first user and the second user (e.g., the first user communicating the location of an object of interest in a chat box or with voice communication to the second user).

At step 840, the video game application determines if the first communication contains positional information. If the answer at step 840 is no, process 800 optionally continues to step 845. At step 845, a waiting period may be initiated before process 800 reverts to step 810. If the waiting period isn't initiated, process 800 may revert to step 810 immediately or process 800 ends. For example, the first communication may be an acknowledgement or confirmation of a previous communication, and therefore will not contain any positional information between the first and second user. Accordingly, process 800 can revert to step 810 or step 830 to receive another communication between the first user and the second user, and redetermined the position vectors of the first and second users.

If the answer at step 840 is yes, process 800 continues to step 850. In some examples, the first communication may contain positional information that is already an ideal or model callout. In which case another determination step, comprising determining if the positional information in the first communication can be improved, is made after step 840. In this example, if the positional information cannot be improved, then process 800 ends or returns to step 810.

At step 850, the video game application calculates a translation vector between the first positional vector and the second positional vector. In practice, this is carried out by determining the coordinates of each avatar relative to the origin, for example, Player 1's avatar is at $(x_1, y_1, z_1)$ and Player 2's avatar is at $(x_2, y_2, z_2)$. The translation vector between Player 1's avatar to Player 2's avatar is therefore $$\vec{P_1P_2} = (x_2 - x_1)\ \hat{i} + (y_2 - y_1)\ \hat{j} + (z_2 - z_1)\ \hat{k},$$

where $\hat{i}$, $\hat{j}$, and $\hat{k}$ are orthogonal unit vectors; the same can be done to determine the translation vector between Player 2's avatar to Player 1's avatar, mutatis mutandis.

At step 860, the video game application corrects the first positional information based on the first translation vector (e.g., providing information relative to the second user's position and direction, instead of the first user's position and direction). For example, the positional information in the first communication may include a direction, distance, elevation, or other information describing a particular location within the game environment relative to the first user's current position and/or field of view. Using the translation vector, the positional information may be corrected so that the direction, distance, elevation, or other information instead describes the particular location within the game environment relative to the position and/or field of view of the second user. At step 870, the video game application transmits the corrected positional information to the second user. For example, the first positional information may be transmitted to the second user via the second user's chat box (e.g., chat box 237 of FIG. 2A). In another example, the first positional information may be transmitted to the second user audibly through speakers, a headset, or the like. For instance, a spoken communication from the first user may be modified with the corrected positional information and the modified communication may be provided audibly, in real-time, to the second user instead of the original first communication.

Figure 9:
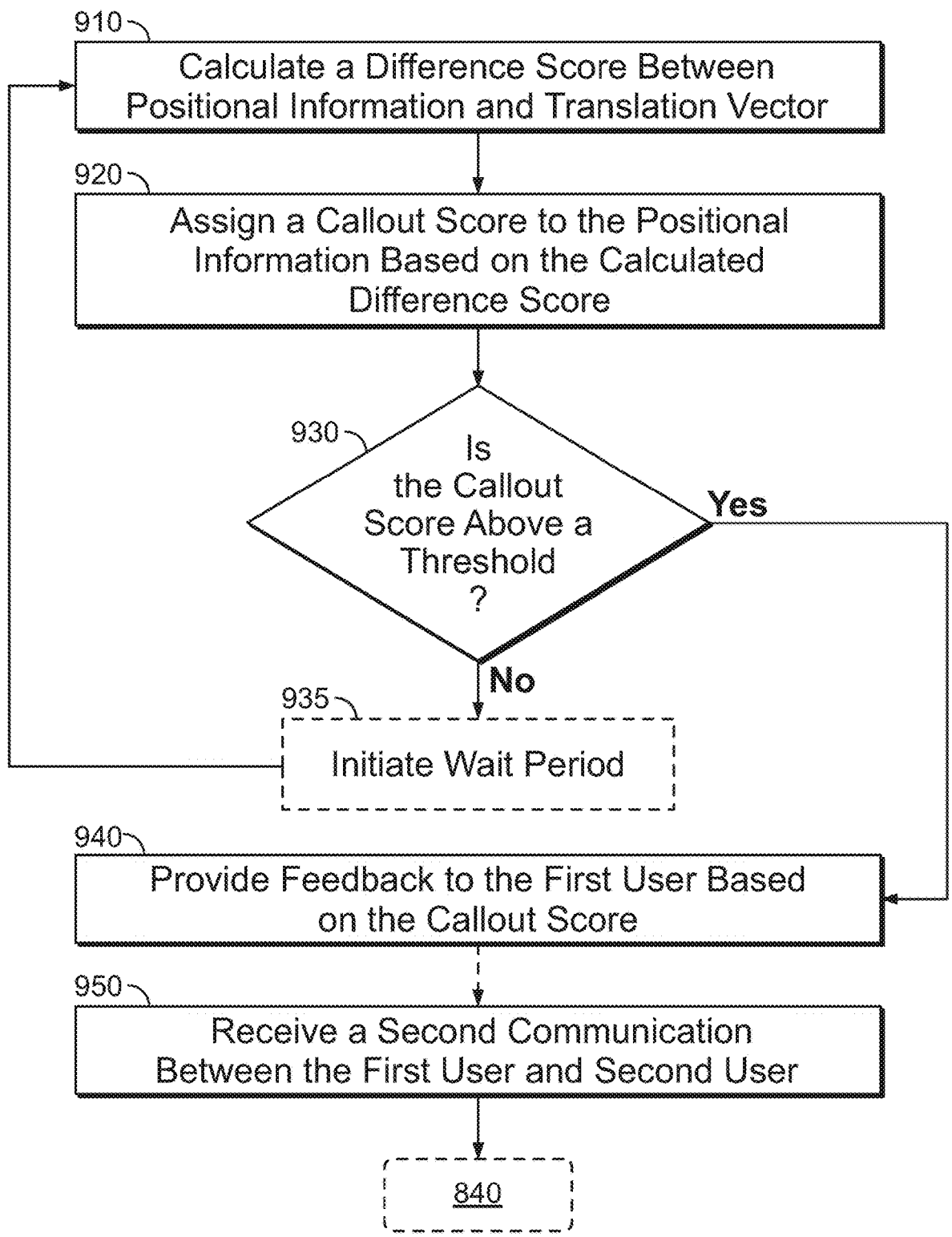
FIG. 9 is an illustrative flowchart of a process for calculating a callout score and providing feedback to a user, in accordance with some embodiments of the disclosure.

FIG. 9 is an illustrative flowchart of a process for calculating a callout score and providing feedback to a user, in accordance with some embodiments of the disclosure. It should be noted that process 900 or any step thereof could be performed on, or provided by, any of the devices shown in FIGS. 6 and 7. In addition, one or more steps of process 900 may be incorporated into or combined with one or more steps of any other process or embodiment (e.g., process 800 (FIG. 9)).

At step 910, the video game application calculates a difference score between positional information and translation vector. For example, at the time the first communication is received, an object of interest may be identified in the first FOV of the first user. The system can determine, or look up, an ideal phraseology or natural language input (e.g., a phraseology that would yield a perfect or model callout score (i.e., 10/10, 100%, etc.)) and compare the ideal phraseology (e.g., ideal positional information) to the first communication to calculate a difference score between the positional information in the first communication and the ideal positional information that should have been given to the second user. In some examples, the ideal positional information will update according to the relative position of the first and second user. That is to say that as the second user moves through the video game environment, the ideal positional information may need updating to reflect the movement of the second user. Accordingly, the ideal positional information can be determined based on the translation (and/or rotational) vector, between the first and second user, and/or a third positional vector of an object of interest; so that as the second user moves through the video game environment the ideal positional information, knowing that the object of interest is the target, can be updated accordingly.

At step 920, the video game application assigns a callout score to the positional information based on the calculated difference score. For example, the difference score may be an arbitrary metric, whereas the callout score may be a score out of 10, which a user can readily understand. The callout score is determined based on the calculated difference score, and therefore feedback can be provided to the first user based on the callout score. In the calculation of the difference score, the video game application may use a database of natural language inputs and analyze the natural language input received in the first communication between the first user and second user. The callout score can therefore be based on accuracy, conciseness, completeness, and/or proper use of terminology of the content of the first positional information regarding the video game environment and its parameters, as well as the object of interest, which will be explained in more detailed with reference to FIG. 12, below.

At step 930, the video game application determines if the callout score is above a threshold. If the answer at step 930 is no, process 900 optionally continues to step 935. At step 935, a waiting period may be initiated before process 900 reverts to step 910. If the waiting period is not initiated, process 900 may revert to step 910 immediately or process 900 ends. If the answer at step 930 is yes, process 900 continues to step 935.

At step 940 the video game application provides the feedback to the first user based on the callout score. For example, if Player 1's chat box shows that the information they provided was given a callout score of 6/10. The first user is provided with feedback (e.g., a suggestion) to improve in their call-outs in the future, such as "Suggestion: try giving your teammate directions relative to their position." In some examples, the on-screen visualization (e.g., by highlighting or underlining keywords) of relevant information in the feedback can be made, which helps to train players to provide better callouts by highlighting keywords that are ideal. After step 940, process 900 can optionally end. However, in some examples, process 900 can continue to step 950. At step 950, the video game application receives a second communication between the first user and second user, and process 900 continues to step 840 of process 800, as described with reference to FIG. 8.

Figure 10:
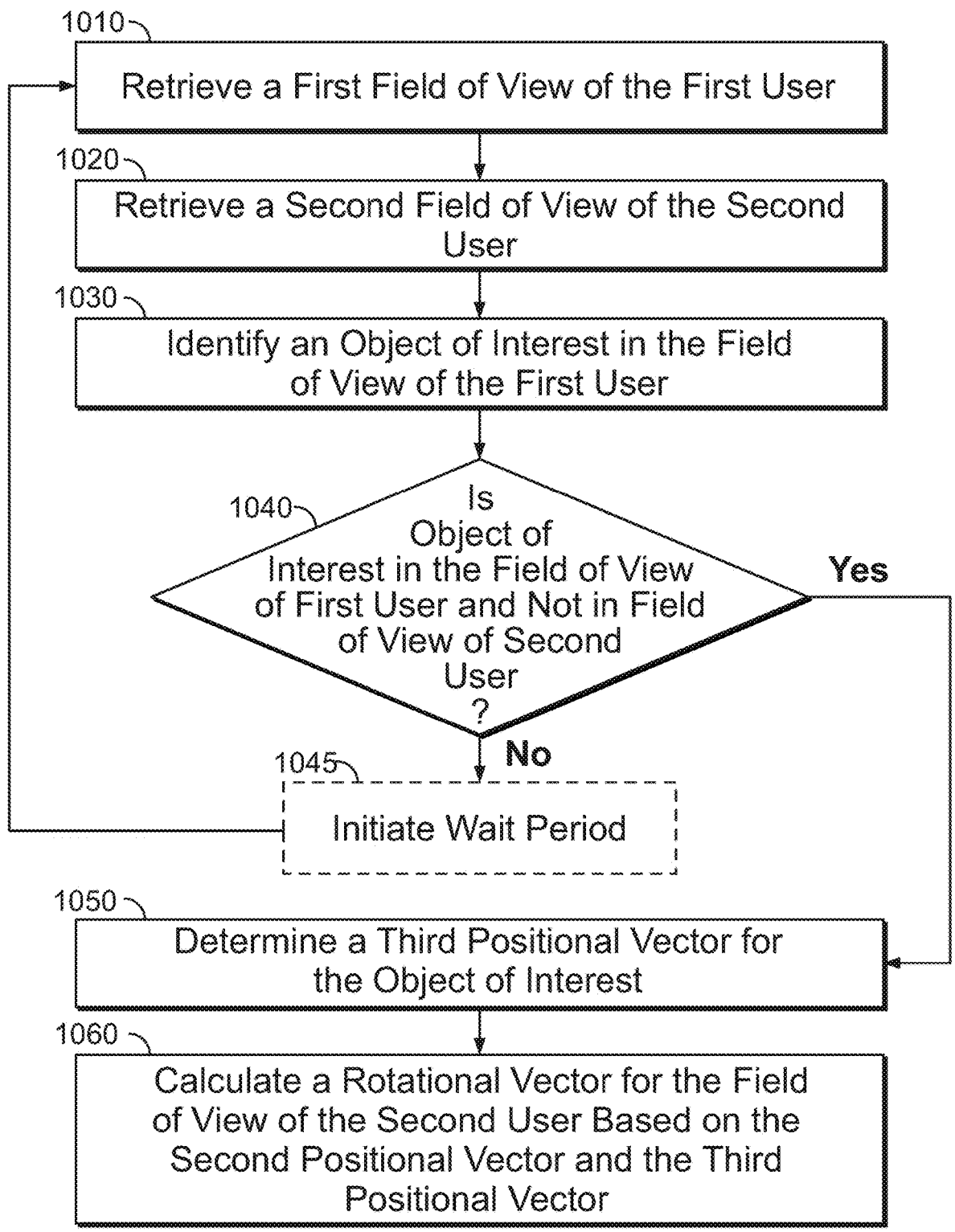
FIG. 10 is an illustrative flowchart of a process for identifying an object of interest in a field of view one user in a video game environment, in accordance with some embodiments of the disclosure.

FIG. 10 is an illustrative flowchart of a process for identifying an object of interest in a field of view of one user in a video game environment, in accordance with some embodiments of the disclosure. It should be noted that process 1000 or any step thereof could be performed on, or provided by, any of the devices shown in FIGS. 6 & 7. In addition, one or more steps of process 1000 may be incorporated into or combined with one or more steps of any other process or embodiment (e.g., process 900 (FIG. 9)).

At step 1010, the video game application retrieves the first field of view of the first user. At step 1020, the video game application retrieves the second field of view of the second user. The field of view of a user may be retrieved from data within the video game environment, or determined based on the avatar's positional vector (e.g., location within the video game environment and the direction they are facing). Typically, the FOV of an avatar in a video game environment is different from the field of view of the user, that is, the field of view of the user may be first person (i.e., from the perspective of the avatar) or third person (i.e., a view comprising the user's avatar and the surrounding area). The FOV of the avatar can be further affected by the user's actions, for example, in an FPS video game, if the user is aiming down the sights of a weapon, the field of view is reduced and magnified; in other games, FOV is manipulated by in-game mechanics, such as the "fog of war" in MOBA games, which require friendly avatars in an area to expand the FOV.

At step 1030, the video game application identifies an object of interest in the field of view of the first user. For example, objects of interest may include landmarks (e.g., a tree, a roof, an upstairs window, etc.) and or objective/targets (e.g., an enemy avatar, a flag to capture, etc.) At step 1040, the video game application determines if an object of interest is in the field of view of the first user and not in the field of view of the second user. If the answer at step 1040 is no, process 1000 optionally continues to step 1045. At step 1045, a waiting period may be initiated before process 1000 reverts to step 1010. If the waiting period isn't initiated, process 1000 may revert to step 1010 immediately or process 1000 ends. If the answer at step 1040 is yes, process 1000 continues to step 1050. For example, video game environments featuring first-person or third-person perspectives require three-dimensional rendering of the video game environments, in which avatars associated with a user may move and enter into or out of a user's field of view. Describing features in three-dimensional environments that a user can see in their field of view, such as in audio communications, is common, but not necessarily helpful to other users with a different field of view. Obtaining and using the field of view of a user or their avatar can assist in the identification of an object of interest and therefore an indication to the second user of the location of the objection of interest from their perspective. If the object of interest is already in the FOV of the second user, then the system can reduce the level of intervention and simply provide an on-screen graphic or correct the first positional information minimally (e.g., to improve the callout to as close to ideal as possible).

At step 1050, the video game application determines a third positional vector for the object of interest. The positional vector of the object of interest is determined in the same way the positional vector for the first or second user's avatar is. For example, relative to an origin point (e.g., origin 100 of FIG. 1) in the video game environment, the location and distance of the object of interest (e.g., an enemy) within the boundaries of the game environment is determined by determining the coordinates of the object relative to the origin, for example, if Player 1's avatar is at $(x_3, y_3, z_3)$, the positional vector is therefore $$\overrightarrow{OObj_1} = x_3\ \hat{i} + y_3\ \hat{j} + z_3\ \hat{k},$$

where $\hat{i}$, $\hat{j}$, and $\hat{k}$ are orthogonal unit vectors.

At step 1060, the video game application calculates a rotational vector for the field of view of the second user based on the second positional vector and the third positional vector. The rotational vector is the amount of rotational required to place the object of interest substantially within the field of view of the second user. The rotational vector can be determined by determining, relative to a chosen axis, a bearing of the object to the second user after the translation vector has been applied. For example, if the second user's avatar is located at $(x_2, y_2, z_2)$ and, after applying the translation vector, the second user's avatar is located at $(x_3+\Delta x, y_3+\Delta y, z_2+\Delta z)$, the object of interest may be located at a bearing of 090 relative to a common axis (such as in the x-direction of the video game environment), which the second user's avatar is facing. Accordingly, a rotational vector can be calculated as $$\vec{\theta} = \frac{\pi}{2}\vec{e},$$

where $\vec{e}$ is a unit vector parallel to the common axis, and $$\frac{\pi}{2}$$

is 90 degrees in radians, the avatar facing 000 (e.g., in the x-direction) in this example.

Figure 11:
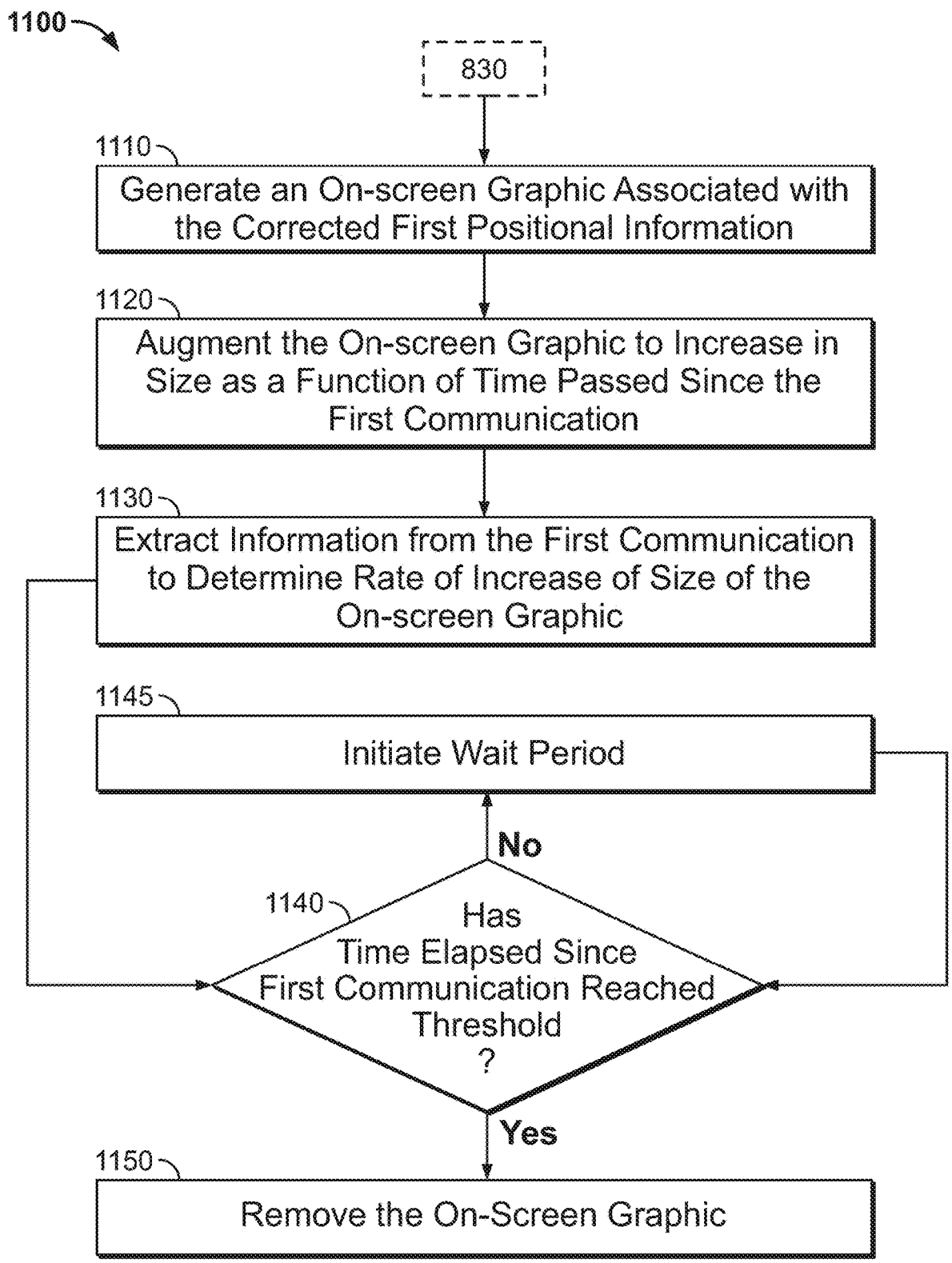
FIG. 11 is an illustrative flowchart of a process for generating an on-screen graphic in a video game environment, in accordance with some embodiments of the disclosure.

FIG. 11 is an illustrative flowchart of a process for generating an on-screen graphic in a video game environment, in accordance with some embodiments of the disclosure. It should be noted that process 1100 or any step thereof could be performed on, or provided by, any of the devices shown in FIGS. 6 & 7. In addition, one or more steps of process 1100 may be incorporated into or combined with one or more steps of any other process or embodiment (e.g., process 900 (FIG. 9)).

Process 1100 starts at step 1110. However, process 1110 may be initiated after step 830 of process 800. At step 1110, an on-screen graphic associated with the corrected first positional information is generated. In some examples, the on-screen graphic is used to aid users new to the game, as shown and described in FIGS. 3A, 3B, 5A and 5B.

At step 1120, the on-screen graphic is augmented to increase in size as a function of time passed since the first communication. For example, the video game application may, in the first instance, determine the size of the on-screen graphic based on a distance, within the video game environment, to a spotted enemy avatar or object of interest, as described above with reference to FIG. 3A. The radius of the on-screen graphic may be increased over time to show that the player, or object of interest, is likely still within a zone, but exactly where within the zone is unknown.

At step 1130, information from the first communication to determine the rate of increase of size of the on-screen graphic is extracted. At step 1140, the video game application determines if the time elapsed since the first communication has reached a threshold. If the answer at step 1140 is no, process 1100 optionally continues to step 1145. At step 1145, a waiting period is initiated before process 1100 reverts to step 1140. If the answer at step 1140 is yes, process 1100 continues to step 1150. At step 1150, the on-screen graphic is removed.

Figure 12:
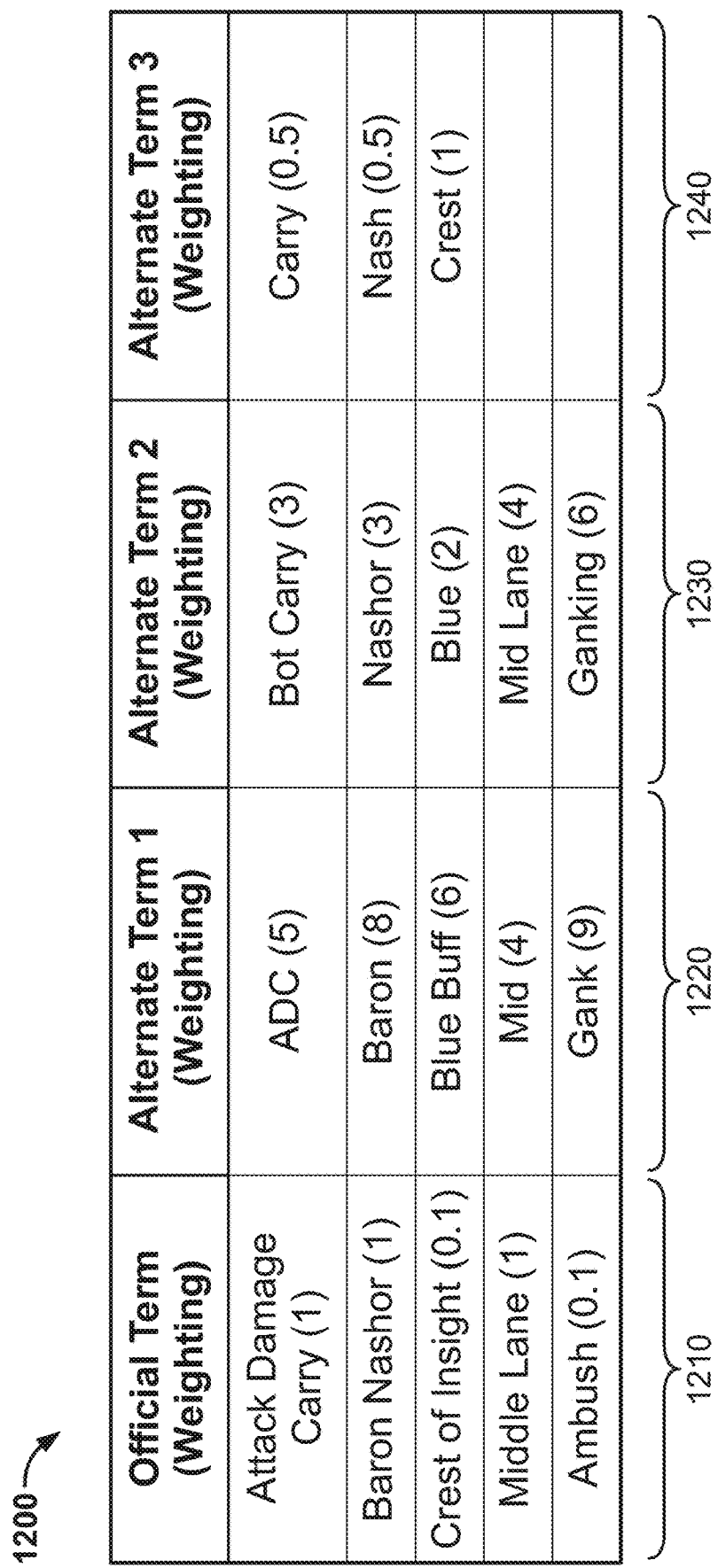
FIG. 12 illustrates a table of language extracted from media content and weighting assigned to the terms, in accordance with some embodiments of the disclosure.

FIG. 12 illustrates a table of language extracted from media content and weighting assigned to the terms, in accordance with some embodiments of the disclosure. Shown in table 1200 is a series of terms that have been extracted from media content external to the video game environment. For example, media content sources may comprise YouTube videos, Twitch VODs, Facebook Gaming VODs, in-game communications from other users, or the like. Column 1210 of FIG. 12 shows the "official terms," that is the terms that the video game designers intended to be used when designing the video game. Columns 1220-1240 show the "alternate terms," that is, the terms that have been extracted from the media content sources. For example, the in-game non-player character (NPC), Baron Nashor from the MOBA video game, League of Legends is often referred to as, "Baron," "Nashor," or "Nash."

Also shown in each of columns 1210-1240 is a weighting score. After extracting information from the media content, a weighting is assigned to the more frequent language found in the media content; in this way the ideal language that should be used in an in-game callout is related to the most common language used by the wider community of players/users. For example, the in-game item "Crest of Insight," also from League of Legends, is seldom referred to as such. Instead, players tend to refer to the item as "Blue Buff" or simply "Blue." Accordingly, Crest of Insight has a score of 0.1, Blue Buff a score of 6, Blue a score of 2, and crest a score of 1. The values for the weightings are relative to one another. FIG. 12 has other examples of official terms and alternate terms with associated weightings.

The term with the highest weighting out of the official term and alternate terms is selected to be the ideal or model term to be used in providing feedback to the first user. In some examples, the term with the highest weighting is also used to correct the first positional information contained within the first communication between the first user and second user.

In some examples, the callout score assigned to the first positional information detected in the first communication is based on the weighting assigned to the terminology. For example, a higher callout score may be assigned to Player 1 using the term "ADC" instead of "carry" as the former term has a higher weighting than the latter. In another example, if player 1 says "Viper Low AK Hall End" this could get a high score based on accuracy of each piece of information—is the enemy actually the Viper avatar, calling out a health status may be useful and could increase a score, likewise with a correct weapon identification and location. Scoring location information in the communication may consider accuracy of a relative location (e.g., player 1 identifying an enemy "20 feet in front of me," the enemy actually being 50 feet in front of the player at the time of the communication) and use of map location names. In contrast, player 1 saying "enemy in front of me" would get a relatively lower score, as no terminology is used, and the communication is also lacking specific location in formation, weapon information, health information, and the like.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment appropriately, done in different orders, or done in parallel. In addition, the systems and methods described herein may be performed in real time. It should also be noted that the systems and/or methods described above may be applied to, or used in accordance with, other systems and/or methods. In this specification, the following terms may be understood given the below explanations:

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to," and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed.

The reader's attention is directed to all papers and documents that are filed concurrently with or previous to this specification in connection with this application and which are open to public inspection with this specification, and the contents of all such papers and documents are incorporated herein by reference.

What is claimed is:

1. A method for providing smart communications in a video game environment, the method comprising:
   determining a first positional vector of an area occupied by a first avatar of a first user within a video game environment in relation to a point in the video game environment;
   determining a second positional vector of an area occupied by a second avatar of a second user within the video game environment in relation to the point in the video game environment;
   detecting, in a first communication from the first user to the second user, first positional information indicative of a location of an object of interest in relation to the first avatar;
   calculating a first translation vector between the first positional vector of the first user and the second positional vector of the second user;
   correcting the first positional information based on the first translation vector; and
   causing to be generated for display the corrected first positional information to the second user.

2. The method of claim 1, wherein correcting the first positional information is carried out in response to the first positional information not corresponding to the translation vector.

3. The method of claim 2, further comprising:
   calculating a difference score between the first positional information and video game environment data;
   assigning a callout score to the first positional information based on the calculated difference score; and
   providing feedback to the first user based on the callout score.

4. The method of claim 1, further comprising:
   retrieving a first field of view of the first user;
   retrieving a second field of view of the second user;
   identifying an object of interest in the field of view of the first user;
   wherein the object of interest is not in the field of view of the second user; and
   wherein the correcting of the first positional information is also based on the object of interest.

5. The method of claim 4, wherein the object of interest is one or more of: a user, an avatar of a user, an enemy, an immovable object, a moveable object, a target zone, or an item.

6. The method of claim 1, wherein detecting first positional information further comprises:
   extracting directional information from the first communication from the first user;
   extracting landmark information from the first communication from the first user;
   extracting supplementary information about the video game environment; and
   wherein the supplementary information is at least one of: a username, a user-health status, a weapon used by a user, movement characteristics of a user, type of object of interest, characteristics of an object of interest, movement characteristics of an object of interest, a user action, a user intention, or a timestamp of the communication.

7. The method of claim 1, further comprising:
   extracting language from media content external to the video game environment, wherein the media content is related to the video game environment;
   creating a library of model language based on the language of the media content, wherein a weighting is given to frequently used language in the media content;
   identifying language in the first communication;
   comparing the language in the first communication with the library of model language; and
   providing feedback to the first user based on the comparison.

8. The method of claim 1, further comprising:
   generating an on-screen graphic associated with the corrected first positional information;
   augmenting the on-screen graphic to increase in size as a function of time passed since the first communication; and
   removing the on-screen graphic when the function of time passed reaches a threshold.

9. The method of claim 8, further comprising:
   extracting information from the first communication; and
   determining a rate of increase of the on-screen graphic based on the information extracted from the first communication.

10. The method of claim 9, wherein the extracted information comprises at least one of: movement characteristics of a user, type of object of interest, characteristics of an object of interest, movement characteristics of an object of interest, a user action, a user intention, or a timestamp of the communication.

11. The method of claim 9, wherein the threshold is determined based on the information extracted from the first communication.

12. The method of claim 1, wherein the first positional vector is associated with an area within the video game environment occupied by an avatar of the first user, and wherein the second positional vector is associated with an area within the video game environment occupied by an avatar of the second user.

13. The method of claim 1, wherein the first communication comprises text describing the first positional information indicative of the location of the object of interest from the perspective of the first avatar, and the corrected first positional information that is generated for display comprises a correction of the text of the first communication, the corrected text indicating the location of the object of interest from a perspective of the second avatar.

14. A method for providing smart communications in a video game environment, the method comprising:
   determining a first positional vector of a first user within a video game environment;
   determining a second positional vector of a second user within the video game environment;
   retrieving a first field of view of the first user;
   retrieving a second field of view of the second user;
   identifying an object of interest in the field of view of the first user, wherein the object of interest is not in the field of view of the second user;
   detecting, in a first communication from the first user to the second user, first positional information;
   calculating a first translation vector between the first positional vector of the first user and the second positional vector of the second user;
   correcting the first positional information based on the first translation vector, wherein the correcting of the first positional information is also based on the object of interest;
   causing to be generated for display the corrected first positional information to the second user;
   determining a third positional vector for the object of interest; and
   calculating a first rotational vector for the field of view of the second user based on the second positional vector and the third positional vector, and
   wherein the first rotational vector is the amount of rotational required to place the object of interest substantially within the field of view of the second user.

15. The method of claim 14, wherein correcting the first positional information further comprises:
   transcribing the first rotational vector into a set of user-readable instructions; and
   transmitting the user-readable instructions to a computing device of the second user.

16. The method of claim 14, further comprising:
   determining the object of interest is obscured by a second object within the video game environment;
   calculating a second translation vector based on the second positional vector of the second user and the first rotational vector; and
   updating the first rotational vector based on the second translation vector.

17. A media device comprising a control module, a transceiver module and a network module, configured to:
   determine a first positional vector of an area occupied by a first avatar of a first user within a video game environment in relation to a point in the video game environment;
   determine a second positional vector of an area occupied by a second avatar of a second user within the video game environment in relation to the point in the video game environment;
   detect, in a first communication between the first user and second user, first positional information indicative of a location of an object of interest in relation to the first avatar;
   calculate a first translation vector between the first positional vector of the first user and the second positional vector of the second user;
   correct the first positional information based on the first translation vector; and
   cause to be generated for display the first corrected positional information to the second user.

18. The media device of claim 17, wherein correcting the first positional information is carried out in response to the first positional information not corresponding to the translation vector.

19. The media device of claim 18, further comprising:
   calculating a difference score between the first positional information and video game environment data;
   assigning a callout score to the first positional information based on the calculated difference score; and
   providing feedback to the first user based on the callout score.

20. The media device of claim 17, further comprising:
   retrieving a first field of view of the first user;
   retrieving a second field of view of the second user;
   identifying an object of interest in the field of view of the first user;
   wherein the object of interest is not in the field of view of the second user; and
   wherein the correcting of the first positional information is also based on the object of interest.

21. The media device of claim 20, further comprising:
   determining a third positional vector for the object of interest;
   calculating a first rotational vector for the field of view of the second user based on the second positional vector and the third positional vector; and
   wherein the first rotational vector is the amount of rotational required to place the object of interest substantially within the field of view of the second user.

22. The media device of claim 21, wherein correcting the first positional information further comprises:
   transcribing the first rotational vector into a set of user-readable instructions; and
   transmitting the user-readable instructions to a computing device of the second user.

23. The media device of claim 21, further comprising:
   determining the object of interest is obscured by a second object within the video game environment;
   calculating a second translation vector based on the second positional vector of the second user and the first rotational vector; and
   updating the first rotational vector based on the second translation vector.

24. The media device of claim 20, wherein the object of interest is one or more of: a user, an avatar of a user, an enemy, an immovable object, a moveable object, a target zone, or an item.

25. The media device of claim 17, wherein detecting first positional information further comprises:
   extracting directional information from the first communication from the first user;

extracting landmark information from the first communication from the first user;
extracting supplementary information about the video game environment; and
wherein the supplementary information is at least one of: a username, a user-health status, a weapon used by a user, movement characteristics of a user, type of object of interest, characteristics of an object of interest, movement characteristics of an object of interest, a user action, a user intention, or a timestamp of the communication.

26. The media device of claim 17, further comprising:
extracting language from media content external to the video game environment, wherein the media content is related to the video game environment;
creating a library of model language based on the language of the media content, wherein a weighting is given to frequently used language in the media content;
identifying language in the first communication;
comparing the language in the first communication with the library of model language; and
providing feedback to the first user based on the comparison.

27. The media device of claim 17, further comprising:
generating an on-screen graphic associated with the corrected first positional information;
augmenting the on-screen graphic to increase in size as a function of time passed since the first communication; and
removing the on-screen graphic when the function of time passed reaches a threshold.

28. The media device of claim 27, further comprising:
extracting information from the first communication; and
determining rate of increase of the on-screen graphic based on the information extracted from the first communication.

29. The media device of claim 28, wherein the extracted information comprises at least one of: movement characteristics of a user, type of object of interest, characteristics of an object of interest, movement characteristics of an object of interest, a user action, a user intention, or a timestamp of the communication.

30. The media device of claim 28, wherein the threshold is determined based on the information extracted from the first communication.

* * * * *